US010757100B2

(12) United States Patent
Angelino et al.

(10) Patent No.: US 10,757,100 B2
(45) Date of Patent: Aug. 25, 2020

(54) METHODS AND APPARATUS FOR PROTECTING DOMAINS OF A DEVICE FROM UNAUTHORIZED ACCESSES

(71) Applicant: ARM IP Limited, Cambridge (GB)

(72) Inventors: Alessandro Angelino, London (GB); Milosch Meriac, Cambridge (GB)

(73) Assignee: ARM IP Limited, Cambridge (GB)

( * ) Notice: Subject to any disclaimer, the term of this patent is extended or adjusted under 35 U.S.C. 154(b) by 154 days.

(21) Appl. No.: 15/659,849

(22) Filed: Jul. 26, 2017

(65) Prior Publication Data

US 2018/0048648 A1 Feb. 15, 2018

(30) Foreign Application Priority Data

Aug. 15, 2016 (GB) .................................. 1613963.6

(51) Int. Cl.
*H04L 29/06* (2006.01)
*G06F 21/60* (2013.01)
(Continued)

(52) U.S. Cl.
CPC ........ *H04L 63/0876* (2013.01); *G06F 21/602* (2013.01); *G06F 21/629* (2013.01);
(Continued)

(58) Field of Classification Search
CPC ............. H04L 63/0815; H04L 63/0471; H04L 67/125; H04L 51/04; H04L 45/00;
(Continued)

(56) References Cited

U.S. PATENT DOCUMENTS

| 5,768,519 A * | 6/1998 | Swift | G06F 21/6218 |
| | | | 707/999.009 |
| 7,739,731 B2 * | 6/2010 | Violleau | G06F 21/335 |
| | | | 713/151 |
| 7,984,170 B1 * | 7/2011 | Shalla | G06F 9/546 |
| | | | 709/217 |
| 8,135,645 B2 * | 3/2012 | Kay | G06Q 20/3674 |
| | | | 380/201 |

(Continued)

FOREIGN PATENT DOCUMENTS

KR 20120140249 A * 12/2012 ........... H04L 63/102
WO WO-2007/047798 A1 * 4/2007 ............. H04L 29/06
(Continued)

OTHER PUBLICATIONS

Search Report dated Feb. 2, 2017 for GB Application No. GB1613963.6, 5 pages.

*Primary Examiner* — Jeffrey C Pwu
*Assistant Examiner* — Ali H. Cheema
(74) *Attorney, Agent, or Firm* — Patterson Thuente Pedersen, P.A.

(57) ABSTRACT

A machine implemented method for protecting a target domain and a source domain from unauthorized accesses. The method comprising: identifying an exit call gateway comprising an exit transition instruction and at least one exit access parameter, said exit access parameters restricting exit from said source domain; identifying an entry call gateway corresponding to said exit call gateway, said entry call gateway comprising a transition instruction and at least one entry access parameter, said entry access parameters restricting access to said target domain; determining that said exit access parameters and said entry access parameters are compatible with each other; and performing a context switch from said source domain to said target domain, when said exit access parameters and said entry access parameters are complied with.

18 Claims, 15 Drawing Sheets

(51) Int. Cl.
*G06F 21/62* (2013.01)
*G06F 21/55* (2013.01)
*H04L 29/12* (2006.01)
*G06F 21/33* (2013.01)

(52) U.S. Cl.
CPC ...... *G06F 21/6218* (2013.01); *H04L 63/0227* (2013.01); *H04L 63/102* (2013.01); *G06F 21/335* (2013.01); *G06F 21/55* (2013.01); *G06F 21/606* (2013.01); *G06F 2221/2113* (2013.01); *G06F 2221/2141* (2013.01); *H04L 29/06* (2013.01); *H04L 61/30* (2013.01); *H04L 63/101* (2013.01)

(58) Field of Classification Search
CPC ..... H04L 63/08; H04L 63/0876; H04L 63/02; H04L 63/0227; H04L 63/10; H04L 63/102; H04L 63/101; H04L 63/20; H04L 61/30; H04L 29/06; G06F 21/74; G06F 21/72; G06F 21/554; G06F 21/6218; G06F 21/62; G06F 21/60; G06F 21/602; G06F 21/629; G06F 2221/21; G06F 2221/2113; G06F 2221/2141; G06F 21/12; G06F 21/53; G06F 21/606; G06F 21/55; G06F 21/335; G06Q 10/107; G06Q 20/3674
USPC ................ 726/22, 4; 709/206, 217; 705/50; 380/201; 370/400; 713/151
See application file for complete search history.

(56) References Cited

U.S. PATENT DOCUMENTS

| | | | |
|---|---|---|---|
| 10,129,214 B2 * | 11/2018 | Clark | G06F 21/00 |
| 2003/0128710 A1 * | 7/2003 | Fedyk | H04L 45/00 370/400 |
| 2007/0005600 A1 * | 1/2007 | Dutta | G06F 21/6218 |
| 2007/0067826 A1 | 3/2007 | Conti | |
| 2007/0130069 A1 * | 6/2007 | Kay | G06Q 10/107 705/50 |
| 2008/0046985 A1 * | 2/2008 | Lenoir | G06F 21/10 726/6 |
| 2012/0042361 A1 * | 2/2012 | Wong | G06F 21/55 726/4 |
| 2012/0159570 A1 | 6/2012 | Reierson et al. | |
| 2012/0284791 A1 * | 11/2012 | Miller | G06F 21/554 726/22 |
| 2015/0039700 A1 * | 2/2015 | West | H04L 51/04 709/206 |
| 2016/0044041 A1 * | 2/2016 | Agarwal | G06F 9/45558 726/4 |
| 2016/0147993 A1 * | 5/2016 | Xu | G06F 21/53 726/22 |
| 2016/0366111 A1 * | 12/2016 | Smith | H04W 12/04033 |
| 2017/0091489 A1 * | 3/2017 | Dragone | G06F 21/72 |
| 2017/0093818 A1 * | 3/2017 | Dayka | H04L 63/0471 |

FOREIGN PATENT DOCUMENTS

| | | | | |
|---|---|---|---|---|
| WO | WO-2012094602 A1 * | 7/2012 | | H04L 61/302 |
| WO | WO 2016/118224 A1 | 7/2016 | | |
| WO | WO-2016118224 A1 * | 7/2016 | | G06F 21/606 |

* cited by examiner

METHODS AND APPARATUS FOR PROTECTING DOMAINS OF A DEVICE FROM UNAUTHORIZED ACCESSES

RELATED APPLICATION

The present application claims priority to GB Application No. 1613963.6 filed Aug. 15, 2016, which is hereby incorporated herein in its entirety by reference The present subject matter relates generally to methods and apparatus for protecting the domains of a device from unauthorized accesses. More specifically, the methods and apparatus relate to an entry call gateway for protecting a target domain from unauthorized accesses and an exit call gateway for protecting a source domain from unauthorized accesses.

Most systems and architectures aim to protect devices from malicious attacks from unauthorized users. There are several known methods of preventing attacks, such as providing areas having different security levels, however, all known methods have disadvantages associated with them.

According to a first technique, there is provided a machine implemented method for protecting a target domain and a source domain from unauthorized accesses. The method comprising: identifying an exit call gateway comprising an exit transition instruction and at least one exit access parameter, said exit access parameters defining an exit point from said source domain; identifying an entry call gateway corresponding to said exit call gateway, said entry call gateway comprising a transition instruction and at least one entry access parameter, said entry access parameters defining an access point to said target domain; determining that said exit access parameters and said entry access parameters are compatible with each other; and performing a context switch from said source domain to said target domain, when said exit access parameters and said entry access parameters are complied with.

According to a second technique, there is provided a data processing apparatus comprising: processing circuitry configured to perform processing functions in response to program instructions, said processing circuitry comprising a target domain, a source domain and a monitor, wherein said monitor is arranged to apply security credentials to said processing circuitry transitioning from said source domain to said target domain to enable said processing circuitry to perform functions in said target domain, and a trusted storage device for storing at least one entry call gateway and at least one exit call gateway, said entry call gateway comprising a transition instruction and entry access parameters restricting access to said target domain, and said exit call gateways comprising a transition instruction and exit access parameters restricting exit from said source domain, said monitor being further arranged to: determine when an exit call gateway is stored in said trusted storage device in response to a transition instruction, and following determination that said exit call gateway is stored in said trusted storage device, suspending at least one access privilege to said source domain defined in said exit access parameters; and determine when an entry call gateway is stored in said trusted storage device in response to a transition instruction, and following determination that said entry call gateway is stored in said trusted storage device, applying said security credentials to said processing circuitry, so that said processing circuitry can perform a target function in said target domain, said entry access parameters comprising said target function.

According to a third technique, there is provided a computer program product comprising program code for performing the methods described herein.

For a better understanding of the embodiments and as to how the same may be carried into effect reference will now be made, by way of example only, to the accompanying figures in which:

FIG. 1 schematically illustrates elements provided at an Internet of Things device;

FIG. 2 schematically illustrates elements provided at an Internet of Things device;

FIG. 3 schematically illustrates two secure areas of a data processing apparatus;

FIG. 4 schematically illustrates a look up table;

FIG. 5 schematically illustrates two secure areas of a data processing apparatus;

FIG. 6 is a flow diagram schematically illustrating a process for determining whether to allow access to a secure area;

FIG. 7A schematically illustrates access parameters for a call gateway;

FIG. 7B schematically illustrates access parameters for a call gateway;

FIG. 7C schematically illustrates access parameters for call gateways;

Reference will now be made in detail to the embodiments, examples of which are illustrated in the accompanying drawings. In the following detailed description numerous specific details are set forth by way of examples in order to provide a thorough understanding of the relevant teachings. However, it will be apparent to one of ordinary skill in the art that the present teachings may be practiced without these specific details.

In other instances, well known methods, procedures, components and/or circuitry have been described at a relatively high-level, without detail, in order to avoid unnecessarily obscuring aspects of the present teachings.

To protect a target domain at a device, such as an Internet of Things (IoT) device, from unauthorized accesses at least one (target/entry) call gateway is provided. The call gateways protect the target domain by granting exclusive accesses, as defined in access parameters, enforcing a specific entry point to the target domain. In addition, to protect a source domain at the device from unauthorized accesses, from the target domain, such as in a mutually-distrustful arrangement, at least one exit call gateway is provided. The exit call gateways protect the source domain by enforcing a specific exit point from the source domain.

Figure 1:
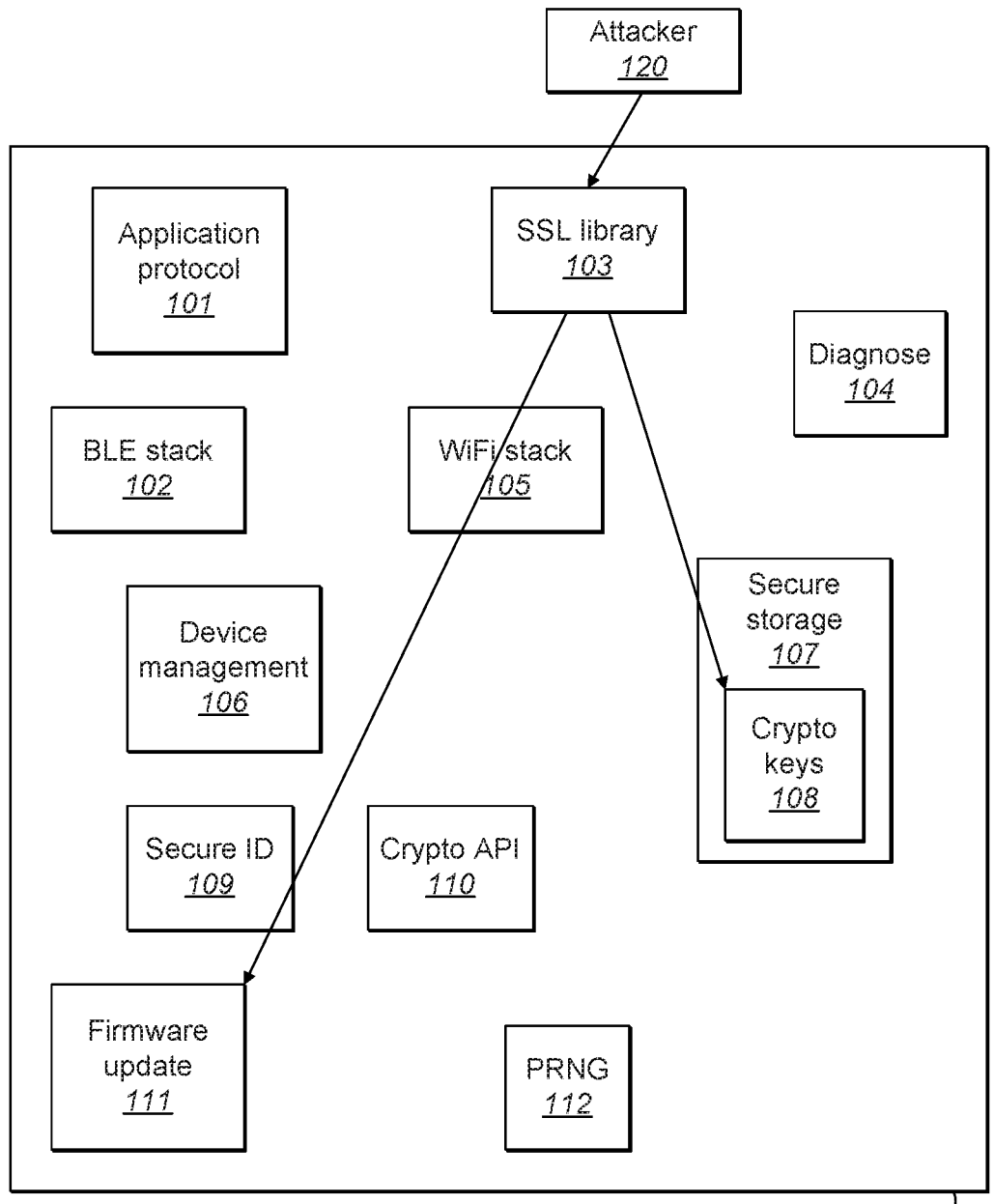

FIG. 1 illustrates schematically, elements provided at an IoT (Internet of Things) device 100. Most systems and architectures aim to protect devices from unauthorized users and unauthorized processes. The device 100 includes numerous modules 101 to 112 and each module 101-112 has its own security aimed at protecting each module and thus the device as a whole from malicious attacks. For example, the code of the crypto keys 107 may be written by a security professional and may have strong security credentials, however the WiFi stack 105 code is unlikely to be written by a security professional and thus unlikely to have the same level of security. This arrangement allows attackers to break a devices security by breaking the security of the "weakest" module (the module with the least security provisions), such that the device's overall security is only as good as the weakest module. Once one of the modules has been compromised it is then possible to gain access to the rest of the modules of the device via the compromised module. Common attack entry points are the SSL library 103, WiFi stack 105 or BLE stack 102. For example, in FIG. 1, the attacker 120 has gained access to the SSL library 103 and has used this access to further gain access to the crypto keys 108 and firmware update 111. In most cases it is impossible to recover from an attack on the firmware update 111 once the firmware update function is compromised by the attacker since resident malware can run safely from RAM and can decide to block commands for resetting the device or erasing the FLASH as part of a "denial of service" attack.

Figure 2:
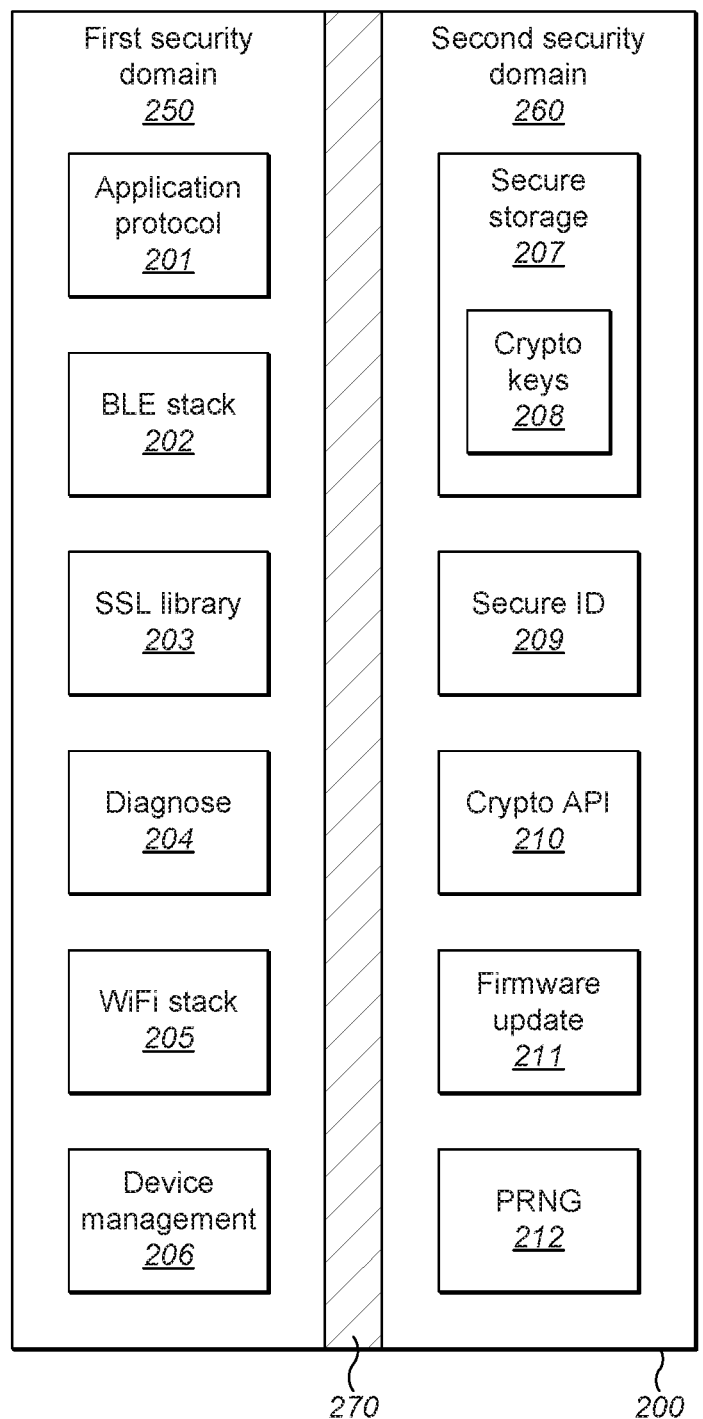

FIG. 2 illustrates schematically elements provided at an IoT device 200. In the device 200, the modules 201 to 212 have been separated into two different domains, a less secure domain 250 for uncritical code and a secure domain 260 for critical code. Modules 201-206 are provided in the less secure domain 250 and modules 207-212 are provided in the secure domain 260. The secure domain requires greater security than the less secure domain, and the two domains are separated by a security boundary 270. Data stored in the secure domain is not accessible to code that is stored in the less secure domain when it is executing. Only the critical code stored in the secure domain may need to have a full security audit. Access to the secure domain cannot be gained via the less secure domain, such that vulnerabilities in the less secure domain cannot compromise the secure domain. The keys 208 never leave the secure domain and cannot be extracted by malicious code.

In addition, the secure domain can reliably re-flash the less secure domain to a clean slate since firmware updates are protected by the secure domain such that malicious attacks can be recovered from via a firmware update.

The modules 207 to 212 on the secure side of the device are required to be implemented with strong security and rarely be changed.

Figure 3:
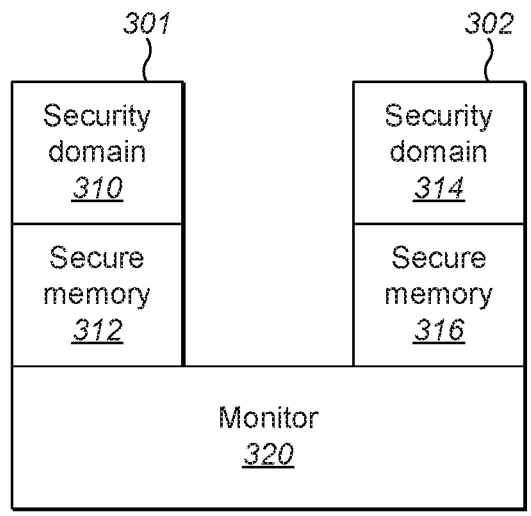

FIG. 3 illustrates schematically two simplified secure areas 301, 302 of a data processing apparatus, for example a less secure area (first secure area 301) and a secure area (second secure area 302). Secure area 301 has a security domain 310 and a secure memory 312, and secure area 302 has a security domain 314 and a secure memory 316. The two secure areas 301, 302 are connected via a monitor 320. Secure area 302 has a higher level of security than secure area 301. The embodiment is not limited to two secure areas and more than two secure areas may be provided, for example, a less secure area, a secure area and a more secure area. In another embodiment, one or more secure areas are provided each having an equivalent level of security, for example, a further less-secure area and/or a further secure area. In another embodiment, a less secure area can be provided together with at least one other secure area, the other secure area(s) having different and/or the same level(s) of security. In some embodiments, the monitor code may only be executed in a monitor mode, accessible only under a limited set of circumstances, such as via an exception, e.g. interrupt, abort, or an explicit call, through which a process may then transition from the less secure area to the secure area, such as that implemented by ARM® TrustZone® technology.

In order for functions from the security domain 310 to access data stored in the secure memory 316 it gains access via the monitor 320 which determines whether the code is allowed to access the security domain 314. When the code is allowed to access the security domain 316, the monitor 320 provides it with the required security credentials. The security credentials may take any form of code or data, such as a piece of evidence, an assertion, or an attribute associated with the code, allowing the code to access the secure area. The security credentials are applied to the code by the monitor, such that authorized access to the secure area is enabled.

The code passes via the monitor 320 in order to be provided with the security credentials of secure area 302. If code tries to jump into security domain 314 directly from security domain 310 without going via the monitor 320, for example during a malicious attack, then the code will not have the required security credentials and so will not be processed in security domain 314. Instead the code is treated as if it is still in secure area 301 as it still has the security credentials of area 301. The only way to obtain the correct security credentials to enter secure area 302 is via the monitor 320.

Figure 4:
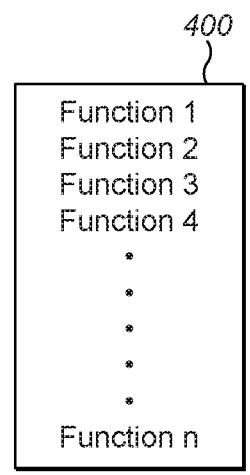

It is possible to know in advance which functions are allowed to access the secure area 302. Therefore, a look up table can be provided listing each function which is allowed to access secure area 302. FIG. 4 schematically illustrates a look up table of valid functions (function 1, function 2, function 3, function 4 . . . function n) which are allowed to access secure area 302. When the monitor 320 receives a request to access the secure area 302, it looks up in the table 400 whether the request is from an allowed valid function. When the function is provided in the look up table 400, and therefore allowed, the request is granted and the function is provided with the security credentials required for secure area 302. When the function is not provided in the look up table 400, and therefore not allowed, either an error message or a fault is generated.

It is not possible for an attacker to add functions to the function look up table as it is stored in a trusted memory.

Although the function table overcomes the problem of unauthorized access to secure areas, when the function table is long, performance of tasks is slowed down as each instruction requires the function table to be searched sequentially until it is determined whether the function appears in the table. This results in unpredictable processing times, i.e. processing times may be short if the function is stored at the top of the table but processing times may be long if the function is stored near the end of the table etc.

If there is more than one security domain having the same or different levels of security/privilege levels, it is possible to have a function table associated with each domain comprising a list of all functions which are allowed access to the associated domain.

In order to reduce processing times, it is possible to use a Hash table, instead of a look up table, to store the authorized functions. The hash table stores the plurality of function entries in an array of buckets. A key is then used to indicate in which bucket the entry can be found (if at all). The use of a hash table reduces the processing time required to identify whether a function is or is not authorized to access the secure area, when compared to a look up table of the same number of functions. However, the processing time is still unpredictable and can be high. Again, the hash table is stored in a trusted memory and therefore cannot be altered (i.e. functions cannot be added) preventing malicious attacks.

In another embodiment, it is possible to use call gateways instead of function tables to determine whether a function can access a different security level/domain.

Figure 5:
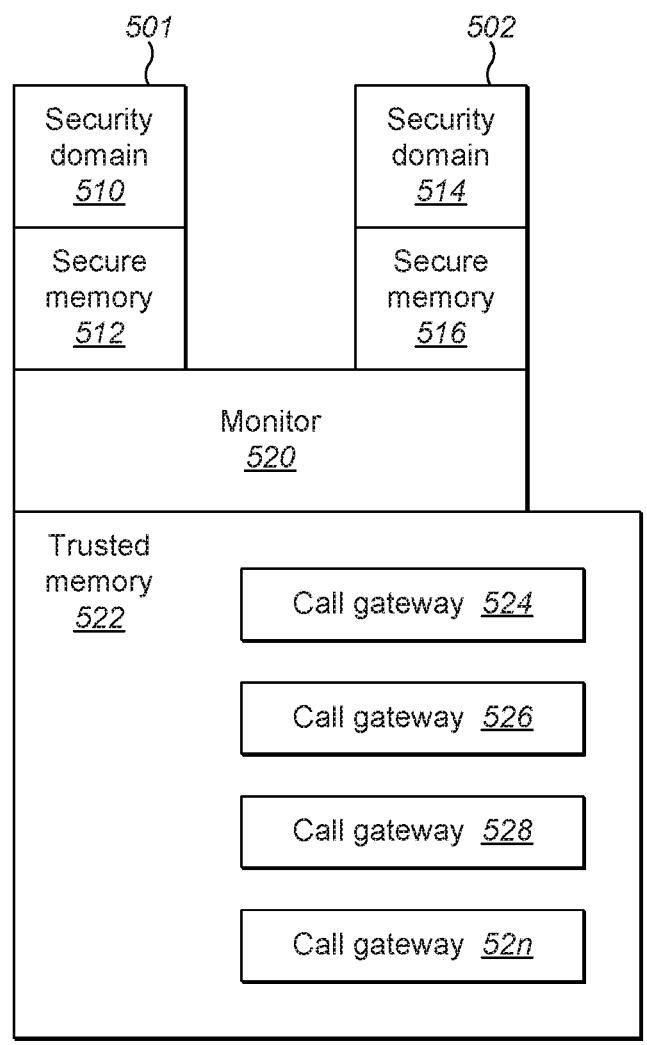

FIG. 5 illustrates schematically two simplified secure areas 501, 502 of a data processing apparatus. In one embodiment, the data processing apparatus is a microprocessor. Although only two secure areas are illustrated, a data processing apparatus may have more than two secure areas, each secure area having its own level of security enforced by call gateways. As stated above the secure areas, may have the same of different levels of security. The data processing apparatus comprises a plurality of component modules provided within at least two different secure areas. In one example, the data processing apparatus may comprise an application protocol module, a BLE stack, an SSL Library, a diagnoses module, a WiFi stack, a device management module, a secure storage module, a secure ID module, a crypto API module, a firmware update module and a PRNG module. However, the data processing apparatus is not limited to these features and other components may be utilized as understood by a person skilled in the art.

As illustrated in FIG. 5, first secure area 501 (a less secure area) has a security domain 510 and a secure memory 512, and second secure area 502 (a more secure area) has a security domain 514 and a secure memory 516. The two secure areas 501, 502 are connected via a monitor 520. Secure area 502 has a higher level of security than secure area 501. The security domains 510, 514 cannot be accessed directly, but instead in order to be provided with the security credentials associated with the second security domain 514, access is granted via the monitor 520. Following completion of functions in the secure area 502, the monitor detaches the security credentials associated with the secure area 502 before returning the program code to area 501. Detachment of the security credentials associated with the secure area 502 prevents the code from continuing to run with secure area 502 security credentials after completion of the function.

In order for functions from the security domain 510 to access data stored in the secure memory 516 it is transferred via the monitor 520 which determines whether the code is allowed to access the security domain 514. When the code is allowed to access the security domain 516, the monitor 520 provides it with the required security credentials. The code passes via the monitor 520 in order to be provided with the security credentials of secure area 502. If code tries to jump into security domain 514 directly from security domain 510 without going via the monitor 520, for example during a malicious attack, then the code will not have the required security credentials of secure area 501 and will not be processed in security domain 514. The only way to obtain the correct credentials to enter security area 502 is to go via the monitor 520. In addition, following performance of a function in the secure area 502, the monitor 520 changes the security credentials of the code back to those of the first secure area 501, otherwise the program code would continue to run with the security credentials of the second secure area 502.

A call gateway is used to request entry to the second secure area 502 from the first secure area 501. The monitor 520 checks whether the call gateway is stored in a trusted memory and when the call gateway is stored in a trusted memory provides the required security credentials for access to area 502. Each call gateway comprises a transition instruction (sometimes referred to as the call gateway instruction or call) and access parameters.

There may be more than one call gateway 524, 526, 528, . . . , 52n stored in the trusted memory 522, each call gateway 524, 526, 528, . . . , 52n having different associated access parameters for each call gateway. In addition, there may be more than one trusted memory storing call gateways.

Each call gateway has access parameters to be met in order for the monitor 520 to provide the security credentials for access to secure area 502. It is known in advance what accesses to the secure area 502 are permitted, therefore call gateways defining the permitted accesses are stored in a trusted memory. In one embodiment, the access parameters define the function which is to be performed in the secure area 502. In another embodiment, the access parameters points to a memory location which can be written to, read from or masked depending on the access defined.

In another embodiment, a call gateway comprises a transition instruction followed by microcode instructions that can be executed with predefined target privileges. In one embodiment, the microcode instructions can be read instructions, write instruction or bit masking instructions or a combination. Microcode can be used when an action is required a number of times which would normally need to go through a call gateway each time the action is performed. For example, when a check of a register is required to determine whether data has been stored at a specific memory location in the register (following a write instruction to that location), a call gateway comprising a transition instruction and a function (the function being check memory) would be needed to access the memory each time the check is performed. This would result in the program transitioning back and forth between the different secure areas. By including microcode for memory read instructions the check can be performed repeatedly until the data has been stored in the memory location without the need to keep accessing call gateways.

The microcode can be verified at the server or during installation. The microcode is only allowed to perform predefined tasks and access predefined bits. In one embodiment, the microcode is the native CPU code. In another embodiment, the microcode is a subset of the CPU code.

The access parameters may also define which module within the secure area 502 can be accessed using a target ID, for example a target module within the security domain 514 or the secure memory 516. In one example, the target ID is the unique ID of the target module. The use of a target ID enables the call gateway to limit which module can be accessed via the call gateway.

The access parameters may also define where an access request can come from using a source ID. In one example, the source ID is the unique ID of the calling module. The use of a source ID enables the call gateway to be limited to code from only predefined source modules (as recited by the source ID). In one embodiment, if no source ID is defined in the access parameters, then the call gateway having no source ID is available for use by all source modules assuming the other access parameters defined in the call gateway are met. Alternatively, a predefined source ID could be used to indicate that all source IDs are allowed. For example, the source ID 0xFF for an 8 bit source ID could indicate that all source IDs are allowed.

Each call gateway 524, 526, 528, . . . , 52n defines different access parameters. Since the call gateways are stored in a trusted memory it cannot be tampered with. Therefore, even if a call gateway was copied, it could only be copied to an untrusted memory, and consequently would not be recognized by the system. All call gateways outside of trusted memories are ignored by the monitor. Accordingly, each call gateway cannot be used by a malicious attacker to allow access to the secure area to perform different functions or functions at different locations within the secure area.

When a call gateway does not have the same access parameters as any of the call gateways stored in the trusted memory, the monitor 520 does not provide the security credentials for access to secure area 502. For example, a call gateway may have access parameters which define that an instruction from a device management module stored in secure area 501 is allowed to access the firmware update module stored in secure area 502 to perform function X. The call gateway being stored in trusted memory 522. Since the call gateway is stored in trusted memory 522, the monitor 520 provides the security credentials to the device management module for access to secure area 502. However, since an instruction from a SSL library module is not normally allowed to access the firmware update module, a call gateway having access parameters which define that an instruction from a SSL library module stored in secure area 501 is allowed to access the firmware update module to perform function X would not be stored in trusted memory. Since such a call gateway is not stored in trusted memory 522, the monitor 520 does not provides the security credentials to the SSL library module for access to secure area 502.

The monitor 520 refers to the call gateway referenced in the request to determine whether the access is allowed. The call gateways are stored in trusted memory 522. The monitor 520 checks that the call gateway is stored in a trusted memory 522. When a call gateway is not stored in a trusted memory, the monitor 522 will not allow access to the secure area 502. In one embodiment, a security violation indication is generated when a call gateway is not stored in a trusted memory. This prevents malicious attackers from creating their own call gateways to gain access to secure areas. A call gateway created by a malicious attacker could only be stored in an untrusted memory. Since, the system disregards call gateways stored in untrusted memory, access to the secure area would not be granted and a security violation indication would indicate that a malicious attack has been attempted.

Once the monitor 522 has determined that the call gateway is stored in a trusted memory, the monitor 522 does not have to verify the access parameters defined in the call gateway. The monitor considers the call gateway access parameters as already verified since the call gateway is stored in a trusted memory.

Figure 6:
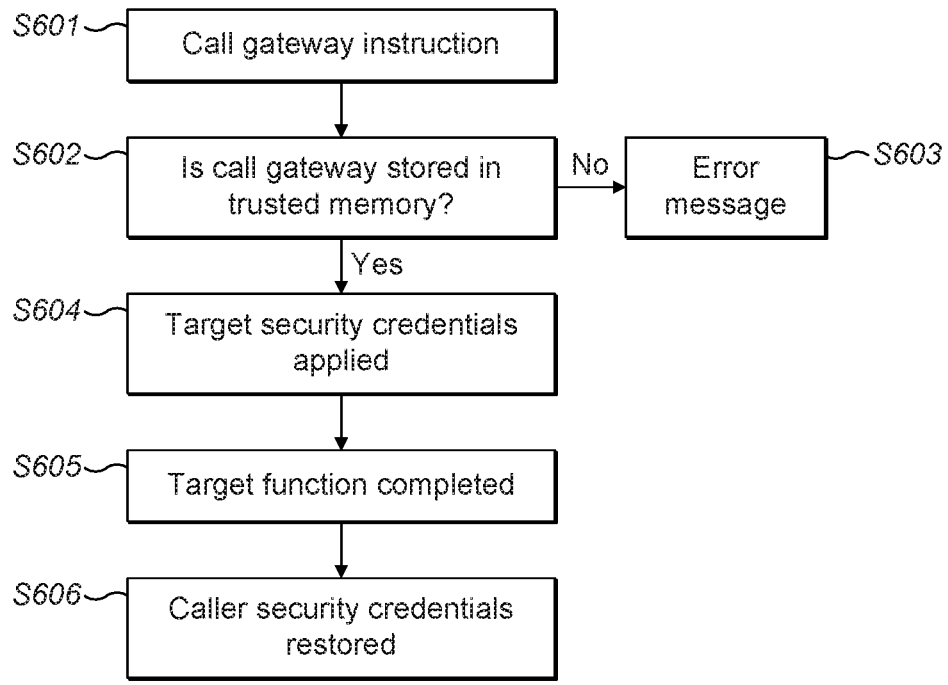

FIG. 6 is a flow diagram schematically illustrating a process for determining whether access to a secure area is allowed. At step S601 a transition instruction is reached in the program code. At step S602 the monitor 520 determines whether a call gateway having the call gateway access parameters is stored in the trusted memory 522. When the identified call gateway is not stored in trusted memory 522 ("NO") the method moves to step S603 and an error message is generated. When the identified call gateway is stored in trusted memory 522 ("YES") the process moves to step S604 and the monitor 520 grants access to the secure area and applies the appropriate security credentials to the processing circuitry (the security credentials required at the target area). At step S605 the call gateway access parameters are interpreted and the target function completed in the secure area. Following completion of the target function in the secure area, the monitor removes the target security credentials from the processing circuitry, the processing circuitry is returned to the caller (source area) security credentials, and the processing circuitry returns to the less secure area at step S606.

When an error message is generated at step S603 access to the secure area 502 is denied.

Since the call gateway is stored in a trusted memory 522, the monitor 520 can trust the access parameters provided in the call gateway. A malicious attacker could create their own call gateway, however, it would not be possible to store this call gateway in a trusted memory, therefore even though the "fake" call gateway defines that the access is allowed, because the "fake" call gateway is not stored in trusted memory the monitor 520 will not grant access. When the call gateway is not stored in a trusted memory, an error message will be returned such as "invalid call gateway".

In one embodiment, the call gateways are written to the trusted memory upon manufacture of the device or data processing apparatus. In addition, call gateways can be written to the trusted memory, for example during updates, but in this example enhanced security credentials are required, such as a valid signature. Verification is then performed before the call gateway is added to the trusted memory. This enhanced verification does not need to be performed again once the call gateway has been stored in the trusted memory. It is not possible to store a call gateway in the trusted memory without a valid signature, preventing a malicious attacker from creating their own call gateway.

A trusted memory is a secure trusted storage device which does not allow a malicious attacker to store data (such as a "fake" call gateway) in the storage device. In one embodiment, the trusted storage device is a trusted section of a storage device which provides both trusted and untrusted storage areas. Any form of trusted memory may be used. In one embodiment, the trusted memory is any memory/storage device that cannot be written to by running code. Any memory can be considered trusted memory when only trusted code has exclusive write access to it. In one example, the trusted memory is a secure memory such as a read only memory (ROM), for example FLASH memory which can only be written to at runtime. In another embodiment, the memory may be marked as unchangeable using a memory protection scheme which prevents malicious attackers from storing data (such as a "fake" call gateway) in the memory. In another example, the trusted memory may be protected SRAM.

In one embodiment, a call gateway comprises a transition instruction followed by access parameters. In one embodiment, the transition instruction is an SVC instruction call. In another embodiment, the transition instruction can be any other platform interrupt call or system call used to transition between security domain states depending on the system being used.

In one embodiment, the access parameter is a target function. In one embodiment, the access parameters are defined in metadata. In another embodiment, the access parameters are target function metadata. The target function metadata points to the target function and is provided either directly following the transition call or at a fixed position in relation to the transition call. Following a transition instruction call in the program code, the monitor retrieves the target function metadata, checks that a call gateway having the target function defined as the access parameters is stored in the trusted memory, and when the call gateway is stored in the trusted memory allows access to the secure area to perform the target function.

In one embodiment, the call gateways are all stored in a trusted call gateway memory. In this embodiment, the transition instruction is followed by a pointer to the call gateway in the trusted call gateway memory.

In another embodiment, a call gateway comprises a transition instruction followed by a pointer to a specific bit/bits of a register, a target register. For example, only one bit, the target bit, of the register may be accessible whilst the other bits in the register are not accessible. In one embodiment, a call gateway may comprise a transition instruction followed by a pointer to a target register along with an optional access mask. A bitmask of the accessible bits and the pointer to the corresponding register are defined in the access parameters of the call gateway and the call gateway is stored in trusted memory. Therefore, the other bits of the register are not accessible via the call gateway. The example: address=0x8BADF00D; access read mask=0xFFFFFFFF; access write mask=0x00000002 allows the requester (source) of the call gateway to read all bits at address 0x8BADF00D but only write bit number 1 (counting from zero) as a result of the 0x2 mask.

Figure 10A:
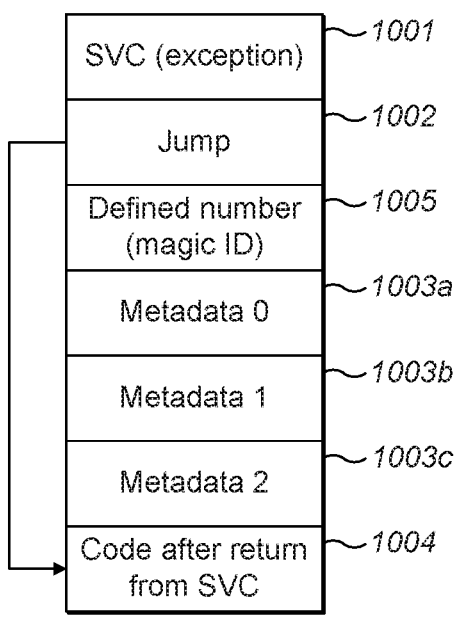
FIG. 10A illustrates the code arrangement when accessing the call gateway of embodiments described with reference to FIGS. 1-9.

In one embodiment, the position of the call gateway is inferred from the return address on the stack. The call gateway returns after the access parameters by modifying the return address on the stack or inside a link-return register. In another embodiment, where the program binary attempts a call gateway, but on a system that does not support call gateways, a call gateway further comprises a jump instruction provided between the transition instruction and the access parameters. A jump instruction (as depicted in FIG. 10A for example) prevents the system from behaving unpredictably when returning from the transition instruction and ending up in metadata instead of valid code. The jump instruction instructs the processing unit to jump the access parameter metadata if the monitor returns from the transition instruction to the program code before the access parameter metadata rather than after the metadata. This enables the program to continue running after the call gateway interrupt. A jump instruction can also be utilized to jump after the microcode instructions or metadata, and thus effectively skip it.

In another embodiment, a call gateway further comprises a defined number. The defined number is considered to be an access parameter. The defined number is carefully selected such that it is a 32 bit number which produces no valid results in code. The defined number does not signify anything and is selected such that it does not naturally occur in code. In one embodiment, any random number could be used as the defined number. However, when the defined number is selected such so that it does not appear in executable code, either directly (as a whole word, for example a 32 bit value) or misaligned (as a half word coupled to other instructions), then server-side verification of the call gateways is stronger and potentially easier. One example of a defined number is the 32 bit number DEAD-BEEF when written in hexadecimal. In one embodiment, one defined number is provided per instruction set. The defined number may be the same or different for all platforms.

It may be possible for the defined number to occur by chance in the system or if the defined number is data, a toolchain could be used to choose another defined number and avoid collisions.

The defined number is always placed at a predetermined position in relation to the transition instruction. Therefore, it is possible to scan the program code and identify all the call gateways, by virtue of identifying the defined number(s) and then determining the position of each call gateway in relation to each identified defined number. Once the call gateways have been identified, they can be verified at the server.

In another embodiment, a call gateway further comprises a target ID. The target ID is the address of the module within the secure domain which is to be accessed. A target ID is used when there is more than one module stored in the secure domain.

In another embodiment, a call gateway further comprises more than one target ID. When the call gateway provides access to more than one predefined target modules, a list of target ID's is provided. In one embodiment, the list of target ID's is provided in the metadata.

In another embodiment, a call gateway further comprises a source ID. The source ID is the address of the module which is allowed to access the secure domain. In one embodiment, the source ID is the unique ID of the calling module. In another embodiment, when the source ID equals 0, the call gateway is available to all modules. In one embodiment, the system discards all attempts to use another modules call gateways. For example, if the WiFi stack tried to use a call gateway provided for the device management module, the source ID of the call gateway would define the device management modules unique ID and therefore could not be used by the WiFi stack, which has a different unique ID.

In another embodiment, a call gateway further comprises more than one source ID. When the call gateway provides access from more than one predefined source modules, a list of source ID's is provided. In one embodiment, the list of source ID's is provided in the metadata.

In one embodiment, a call gateway further includes a flag field which can contain information about the call gateway and the access parameters. In one embodiment, a flag is set to indicate that an access parameter is present. In another embodiment, a flag can be used to express an access parameter. Examples are:

flag for using relative/absolute function pointer in target function;

flags for security features like restrictions on source modules.

In another embodiment, the access parameters include a target instance, which is optional for C++ calls. The target instance points to class specific data and allows a specific class memory instance of a function to be tied to a source module.

In one embodiment, an SVC number can be used to distinguish between multiple call gateways. The SVC number is provided next to the SVC call (the call gateway transition instruction). For example, a SVC number "n" could be used to indicate a call gateway comprising a target function and a target ID. In addition, a different SVC number, for example SVC number "m" could be used to indicate a call gateway comprising a target function, a target ID and a source ID.

Each call gateway comprises a transition instruction followed by an access parameter or a combination of access parameters. The access parameters may be provided in any order, although as stated above, if a defined number to used, the defined number is to be placed at a consistent position with reference to the transition instruction.

Figure 7A:
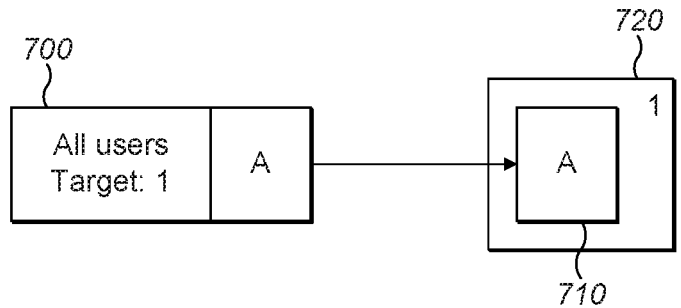

FIG. 7A illustrates schematically a basic call gateway scenario. The call gateway 700 indicates that all source modules are allowed to perform function A 710 at module 1 720. An exemplary call gateway for this scenario comprises a transition instruction (indicating a call gateway interrupt) and access parameters comprising metadata defining the function A (target function); defined number; target ID=1 (indicating that function A can be performed at module 1 only). In another embodiment, the call gateway could also include the term source ID=0 (Source: 0), indicating that all source modules can perform function A at module 1. In this scenario, module 1 720 is provided in a secure area requiring target security credentials.

Figure 7B:
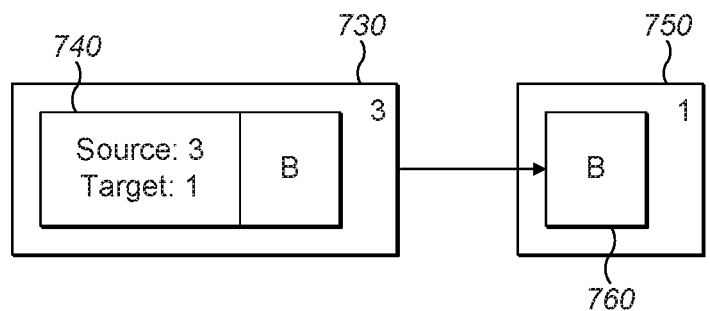

FIG. 7B illustrates schematically another basic call gateway scenario. The call gateway 740 indicates that only source module 3 730 is allowed to perform function B 760 at module 1 750. An exemplary call gateway for this scenario comprises a transition instruction (indicating a call gateway interrupt) and access parameters comprising metadata defining the function B (target function); defined number; target ID=1 (indicating that function B can be performed at module 1 only); source ID=3 (indicating that only source module 3 can perform function B at module 1). In this scenario, module 1 750 is provided in a secure area requiring target security credentials.

Figure 7C:
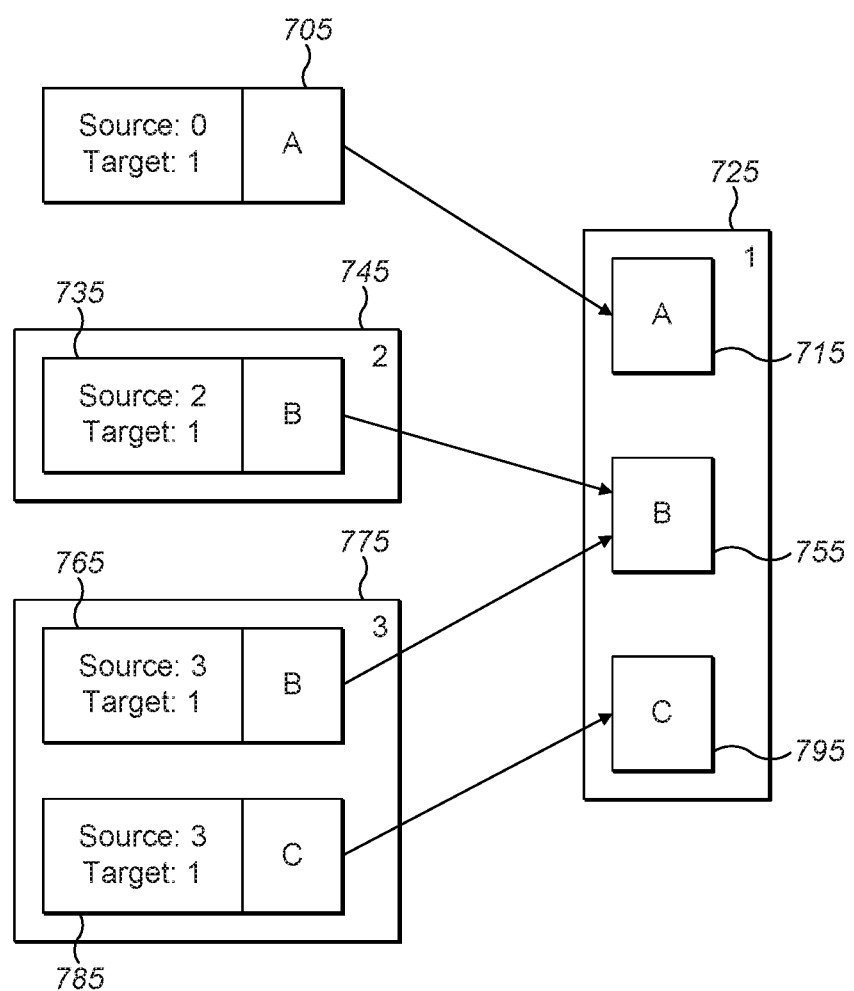

FIG. 7C illustrates schematically a multiple call gateway scenario. The first call gateway 705 allows all source modules to perform function A 715 at target module 1 725. An exemplary call gateway for this scenario comprises a transition instruction (indicating a call gateway interrupt) and access parameters comprising metadata defining the function A (target function); defined number; target ID=1 (indicating that function A can be performed at target module 1 only); source ID=0 (indicating that all source modules can perform function A at target module 1). The second call gateway 735 allows source module 2 745 to perform function B 755 at target module 1 725. An exemplary call gateway for this scenario comprises a transition instruction (indicating a call gateway interrupt) and access parameters comprising metadata defining the function B (target function); defined number; target ID=1 (indicating that function B can be performed at target module 1 only); source ID=2 (indicating that source module 2 can perform function B at module 1). The third call gateway 765 allows source module 3 775 to perform function B 755 at target module 1 725. An exemplary call gateway for this scenario comprises a transition instruction (indicating a call gateway interrupt) and access parameters comprising metadata defining the function B (target function); defined number; target ID=1 (indicating that function B can be performed at target module 1 only); source ID=3 (indicating that source module 3 can perform function B at module 1). Finally, the fourth call gateway 785 allows source module 3 775 to perform function C 795 at target module 1 725. An exemplary call gateway for this scenario comprises a transition instruction (indicating a call gateway interrupt) and access parameters comprising metadata defining the function C (target function); defined number; target ID=1 (indicating that function C can be performed at target module 1 only); source ID=3 (indicating that source module 3 can perform function C at target module 1). In the scenario of FIG. 7C, target module 1 725 is provided in a secure area requiring target security credentials.

As stated above, the call gateways are stored in a trusted memory. However, the call gateways can be stored in a trusted memory provided at the source module, the target module or a separate trusted memory. With reference to FIG. 7C, the first call gateway 705 can be stored in a trusted memory provided at target module 1 725; the second call gateway 735 can be stored in a trusted memory provided at either the source module 2 745 or the target module 1 725; and the third call gateway 765 and the fourth call gateway 785 can be stored in a trusted memory provided at either the source module 3 775 or the target module 1 725.

Below is an example of a call gateway provided in code. In the example, the defined number is referred to as a "magic" number.

```
/* Secure gateway with four parameters */
#define secure_gateway(dst_box, dst_fn, a0, a1, a2, a3)        \
    ({                                                          \
        register uint32_t __r0 asm("r0") = a0;                  \
        register uint32_t __r1 asm("r1") = a1;                  \
        register uint32_t __r2 asm("r2") = a2;                  \
        register uint32_t __r3 asm("r3") = a3;                  \
        register uint32_t __res asm("r0");                      \
        asm volatile(                                           \
            "svc   %[svc_id]\n"                                 \
            "b.n   skip_args%=\n"                               \
            ".word "UVISOR_TO_STRING(UVISOR_SVC_GW_MAGIC)"\n"   \
            ".word "UVISOR_TO_STRING(dst_fn)"\n"                \
            ".word "UVISOR_TO_STRING(dst_box)"__cfg_ptr\n"      \
            "skip_args%=:\n"                                    \
            :     "=r" (__res)                                  \
            : [svc_id] "I" (UVISOR_SVC_ID_SECURE_GATEWAY),      \
              "r" (__r0), "r" (__r1), "r" (__r2), "r" (__r3)    \
        );                                                      \
        __res;                                                  \
    })
```

Example Usage:

```
/* call __secure_print using CGW owned by secure_print_box */
secure_gateway(secure_print_box, __secure_print, 0, 0, 0, 0);
```

Example Call Verification:

```
typedef struct {
    uint16_t opcode;
    uint16_t branch;
    uint32_t magic;
    uint32_t dst_fn;
    uint32_t *cfg_ptr;
} UVISOR_PACKED TSecGw;
#define VMPU_FLASH_ADDR_MASK
    (~(((uint32_t)(FLASH_LENGTH)) − 1))
```

In one embodiment a device, complied at a server, may comprise multiple firmware modules from multiple different providers to create the overall device. Each module having its own security requirements. In one embodiment, the complier of the device has defined an installation rule, such as: each module is only allowed to provide call gateways to functions within its own module. Upon installation of each firmware module, verification of the signature of the firmware module provider is confirmed. A scan of each modules processing code is carried out and all the defined numbers provided in the code are identified. It is then possible to identify each of the call gateways within the module by virtue of the known fixed offset between the position of each defined number and each call gateway. Once the call gateways have been detected, the parameters of each call gateway are identified. When a call gateway points to a module outside the module in which the call gateway is provided installation of the firmware module to the IoT device is refused. In another embodiment, when a call gateway allows access from a module outside the module in which the call gateway is provided installation of the firmware module to the IoT device is refused.

In another embodiment, it is possible for the IoT device to perform the scan of each modules processing code in order to determine if any of the call gateways point to or allow access from modules outside its own module. It is then possible for the IoT device to refuse installation of any modules that contain call gateways which do not comply with the installation rule(s).

Figure 8:
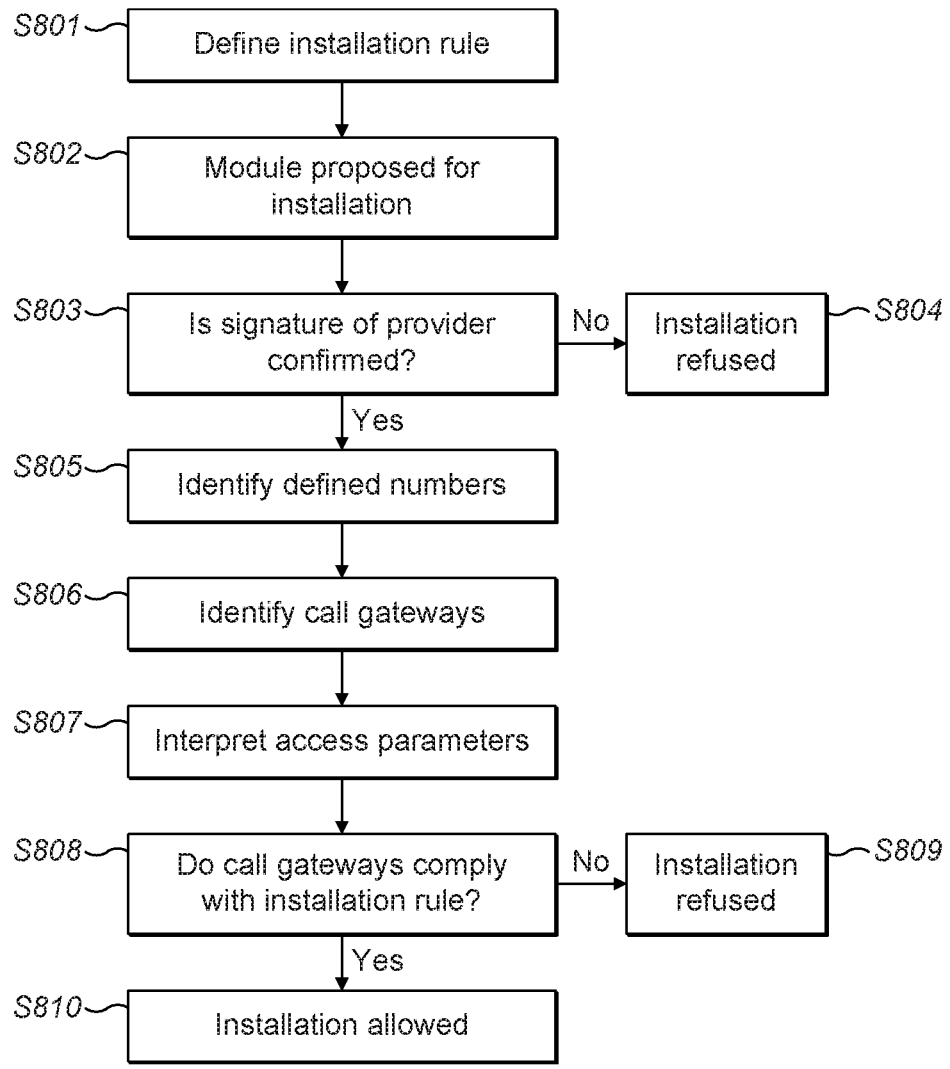
FIG. 8 is a flow diagram schematically illustrating a process for verifying call gateways.

FIG. 8 is a flow diagram schematically illustrating a process for verifying call gateways. At step S801 an installation rule is defined. In this example, the installation rule is: each module is only allowed to provide call gateways to functions within its own module. At step S802 a module is proposed for installation. At step S803 it is determined if the signature of the module provider is confirmed. If the signature of the module provider is not confirmed, then installation of the module is refused at step S804. If the signature of the module provider is confirmed, then the process moves on to step S805. At step S805 a scan of each modules processing code is carried out and all the defined numbers provided in the code are identified. At step S806 the call gateways are identified by virtue of the known fixed offset between the position of each defined number and each call gateway. At step S807 the access parameters of each call gateway are interpreted. At step S808 it is determined if all the call gateways comply with the installation rule. If any of the call gateways do not comply with the installation rule, then installation of the module is refused at step S809. If all of the call gateways do comply with the installation rule, then installation of the module is allowed at step S810 and the call gateways defined within that module are trusted.

In another embodiment, step S803 of confirming the signature of the provider can be performed following step S808 but prior to installation at step S810.

The process of FIG. 8 can be performed at a server or at the device. In addition, the process illustrated in FIG. 8 can also be used when installing a code update.

In another embodiment, an IoT device, complied at a server, may comprise multiple modules from multiple different providers linked to create the overall device. Each module having its own security requirements. In one embodiment, rather than installing each module separately, as described above, a monolithic firmware image of the multiple modules of the device is used. The server uses a map file, created by a trusted source to map the modules of the system and where they have resulted in the firmware image. It is then possible for the server to remember which module came from which provider. A scan of the processing codes of the resulting monolithic firmware image of the overall device is then carried out at the server and all the defined numbers provided in the code are identified. It is then possible to identify each of the call gateways within the code of the overall device by virtue of the known fixed offset between the position of each defined number and each call gateway. Once the call gateways have been detected, the parameters of each call gateway are identified. The map file is then used to determine the provider and/or the module of each call gateway. In one embodiment, the complier of the device has defined an installation rule, such as: each module is only allowed to provide call gateways to functions within its own module or to functions within a module provided by the same provider. If any of the call gateways point to a module outside the module in which the call gateway is provided, or if any of the call gateways allow access from a module outside the module in which the call gateway is provided, installation of the module to the device is refused. In addition, if any of the call gateways point to a module or allow access to a module not provided by the same provider as the module in which the call gateway is provided, installation of the module to the device is refused. The server refuses to sign the firmware image and the firmware is not allowed to be installed at the device. In one embodiment, verification of the call gateways is performed upon installation at the server, following this verification at the server, the call gateways are trusted.

In another embodiment, since the complier of the IoT device defines the installation rule, it is possible to accept call gateways which point to a module or allow access from a module outside the module in which the call gateway is provided if the module is from a trusted provider (not the provider of the call gateway module) as defined in the installation rules.

In another embodiment, it is possible for the IoT device to use a map file and to scan the processing codes of the resulting monolithic firmware image of the overall device to determine if any of the modules contain call gateways which do not comply with the installation rule(s), and to refuse installation of these modules.

In another embodiment, privileges are assigned to a provider enabling them to be granted access to the firmware of a different provider. In one embodiment, further verification is required such as a secure signature before access is granted. It is then permissible for a call gateway from the providers module to point to a module of the different provider, or allow access from a module of the different provider.

When a firmware update is initiated, the signature of the firmware update is verified. Following verification of the signature, a scan of the processing codes of the monolithic firmware image of the overall device is carried out at and all the defined numbers provided in the code are identified. It is then possible to identify each of the call gateways within the code of the overall device by virtue of the known fixed offset between the position of each defined number and each call gateway. Once the call gateways have been detected, the parameters of each call gateway are identified. The map file is then used to determine the provider and/or the module of each call gateway. In one embodiment, the complier of the IoT device has defined an installation rule, such as: each module is only allowed to provide call gateways to functions within its own module or to functions within a module provided by the same provider. If any of the call gateways point to a module outside the update module in which the call gateway is provided, or if any of the call gateways allow access from a module outside the update module in which the call gateway is provided, installation of the firmware update module to the IoT device is refused. In addition, if any of the call gateways point to a module or allow access not provided by the same provider as the update module in which the call gateway is provided, installation of the firmware update module to the IoT device is refused.

This verification can be performed upon each update of firmware at the server. Following verification at the server, the call gateways are trusted.

Verification is performed once per update, once verification has been obtained the firmware is updated and the call gateways are trusted.

Figure 9:
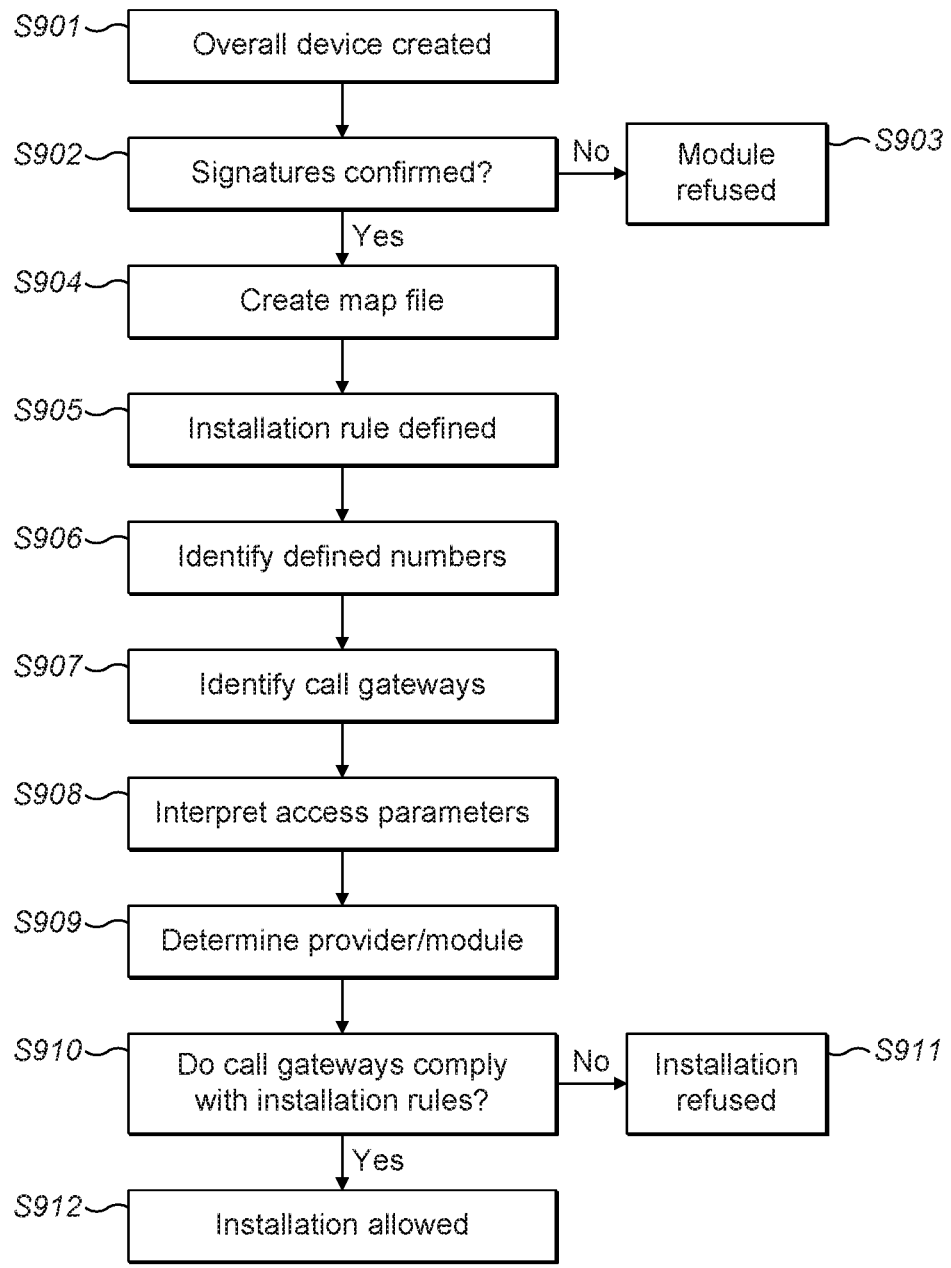
FIG. 9 is a flow diagram schematically illustrating a process for verifying call gateways.

FIG. 9 is a flow diagram schematically illustrating a process for verifying call gateways. At step S901 multiple modules from multiple different providers are linked to create an overall device. At step S902 it is determined if the signature of each module provider is confirmed. If the signature of a module provider is not confirmed, then that module is refused at step S903. If the signatures of the module providers are confirmed, then the process moves on to step S904. At step S904 a map file of the overall device is created. At step S905 an installation rule is defined. In this example, the installation rule is: each module is only allowed to provide call gateways to functions within its own module or to functions within a module provided by the same provider. At step S906 a scan of the processing code of the overall device is carried out and all the defined numbers provided in the code are identified. At step S907 the call gateways are identified by virtue of the known fixed offset between the position of each defined number and each call gateway. At step S908 the access parameters of each call gateway are interpreted. At step S909 the map file is used to determine the provider and/or the module of each call gateway. At step S910 it is determined if all the call gateways comply with the installation rule. If any of the call gateways do not comply with the installation rule, then installation of the module comprising that call gateway is refused at step S911. If the call gateways do comply with the installation rule, then installation is allowed at step S912 and the call gateways are trusted.

In another embodiment, the step S902 of confirming the signature of the provider can be performed at any stage prior to installation at step S912. In another embodiment, the step S903 of defining the installation rule can be performed at any stage prior to step S910.

The process of FIG. 9 can be performed at a server or at the device. In addition, the process illustrated in FIG. 9 can also be used when installing a code update.

The processes of FIGS. 8 and 9 enable security verifications to move from runtime to installation time or to after build time.

As previously described, a jump instruction, as also depicted in FIG. 10A, prevents the system from behaving unpredictably when returning from the transition instruction by branching over the defined number and metadata.

Figure 10B:
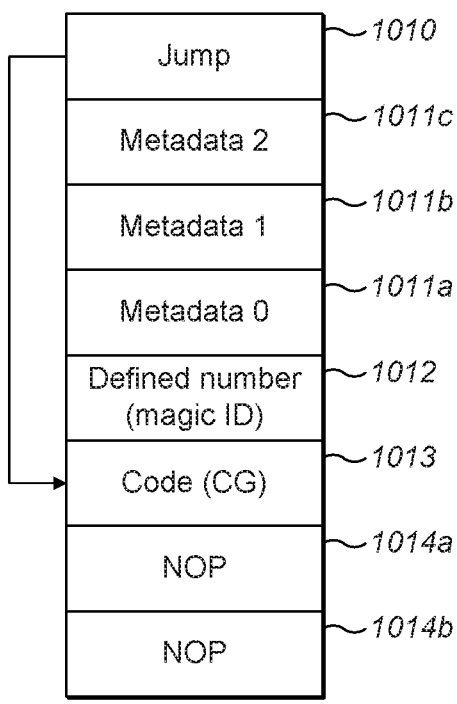
FIG. 10B illustrates the code arrangement of a speculative call gateway embodiment.

FIGS. 10A and 10B provide a side by side comparison of two variants of the call gateway.

FIG. 10A shows the call gateway as previously described with reference to FIGS. 1-9 which is initiated by the SVC transition instruction (exception) 1001 to the call gateway. Defined number (also known as a 'magic number') 1005 and metadata entries 1003a, 1003b, 1003c are present at predetermined positions in relation to the transition instruction 1001 for use by the call gateway.

FIG. 10B shows a variant of the previous embodiments in which the transition instruction is omitted. This variant is hereafter referred to as a speculative call gateway. In this embodiment, a jump operation 1010 (e.g. branch instruction) is first reached which branches directly to code 1013 which is the executable call gateway function and may consist of multiple instructions for execution.

On some platforms, memory protection may be implemented by a memory protection unit (MPU) to partition memory into regions and enable individual protection attributes (e.g. access parameters and the like) for each memory region. In some instances, it may be preferable to speculatively attempt to access locations in a particular memory region and only fail in some instances which have additional protection on sub-regions or individual memory locations, thereby improving the overall performance of a device. One such example is system registers in a device which may be memory mapped and resident in one or more regions of the MPU. Such system registers may have additional attributes meaning they may only be accessible from with a secure state. Due to finite resources within some MPUs, only a defined number of regions may be specifiable, and this means it may be impractical to specifically isolate individual registers into a dedicated memory region with the corresponding attributes.

Should the MPU issue an exception (e.g. abort) because the access to such a memory region incorporating the call gateway code is not permitted, execution branches to an exception handler or monitor. As the address of from which the exception was taken is preserved, the location of the defined number 1012 and metadata entries 1011a-1011c are known (or determinable) by the exception handler/monitor and the operation can then proceed as per the embodiments previously described with referenced to FIGS. 1 to 10A.

In some embodiments, the point at which an exception is taken may be imprecise because of, for example, the pipelining or execution characteristics of the device. To prevent any undesired execution of further operations after the speculative access to the call gateway code 1013, the memory may be padded with one or more "no-operation" (NOPS) instructions which execute no operation, or cause no changes to data and states in the device.

In another embodiment, a device may comprise multiple modules which are not all installed at the same time, for example at manufacture of the device. Since additional modules may be installed at different times it is not possible to provided call gateways for these additional modules at manufacture of the device. Therefore, proxy call gateways can be provided in each module, each proxy call gateway defining specific access permissions for that module. Each proxy call gateway comprises a general description of allowed access permissions but is not itself a call gateway. For example, the general description of allowed access permissions may define which types of modules are and are not allowed to access the target module and which functions the source modules can and cannot perform at the target module.

In one embodiment, a proxy call gateway is provided in a target module provided at a device, the proxy call gateway comprising a general description of allowed access permissions. The proxy call gateway may be stored in trusted memory, the trusted memory being stored at the target module, or in a trusted memory at the device. When a new module is to be installed in the device which requires access to the target module already provided at the device, the new module is provided with a call gateway which allows the new module to perform a function at the target module. The call gateway provided for the new module complies with the general description of allowed access permissions defined in the proxy call gateway provided at the target module. During installation of the new module, the monitor verifies that the call gateway provided at new module complies with the access permissions defined in the proxy call gateway. When the call gateway does not comply with the access permissions defined in the proxy call gateway, the new module is discarded, it is not installed. The monitor will allow the call gateway provided at the new module to restrict the access permissions defined in the proxy call gateway but will not allow the call gateway provided at the new module to expand the access permissions defined in the proxy call gateway. In addition, the monitor will only allow the call gateway provided at new module when it restricts the source module to the new module, i.e. a call gateway is not allowed which provides access for other modules.

In one embodiment, the call gateway provided at new module comprises a target pointer which points to the proxy call gateway. In another embodiment, the call gateway provided at new module is marked (for example in a flag field) as a new call gateway. Verification is independent of the programming language used.

The call gateways described above trigger a context switch from the currently active execution environment at a source domain to another execution environment at a destination (target) domain. A domain is considered to be one or more modules of a system, the one or more modules of each domain all having the same security privileges and accesses.

The call gateway protects the target domain by granting exclusive accesses as defined in the access parameters. The running code is only allowed to access the target domain when the access parameters have been met such that the monitor provides the required security credentials. As stated above, the access parameters can define who (which caller/source) is allowed to call the target domain and what functions/accesses are permitted to be performed at the target domain etc. Consequently, the call gateway enforces an entry point to the target domain to a specific caller and to a specific function/access at the target domain as defined in the access parameters, increasing security at the target domain. The caller is prevented from performing any other functions/access at the target domain apart from those defined in the call gateway, such that following completion of the allowed function/access at the target domain, the running code is no longer allowed access to the target domain and the security credentials are removed.

A user of the system does not need to see that a context switch is being triggered between the source domain and target domain by the call gateway.

The call gateway which protects the target domain can be considered a target call gateway. The target call gateway provides guarantees (it authorizes accesses) that protect the target domain from unauthorized accesses, for example, only functions defined in the target call gateway can be performed at the target domain by a caller defined in the target call gateway.

However, a target call gateway does not enforce any explicit relationship with the source module, since it is a one-way requirement to enter a target domain. A supervisor module, such as the monitor, decides whether the transition is allowed, i.e. whether the target call gateway is stored in a trusted memory and whether entry to the target domain is permitted by the trusted target call gateway. Therefore, a target call gateway does not protect the source domain from the target domain.

In some instances, the caller may require to protect its own resources from the called target domain, such as in a mutually-distrustful arrangement. For example, when code is running in a security-critical context at a source domain and an external untrusted API is called which is in a target domain, it is desirable for the source context to force a context switch to a different secure context to hide/limit its own resources from the target domain, whilst performing a function at the target domain. For example, it may be desirable to suspend the access privileges of the source domain (i.e. force a context switch from the source context to a different secure context), whilst a function is being executed at the target domain. However, a target call gateway only protects the target domain and therefore does not require a context switch to protect the resources at the source domain.

Figure 11A:
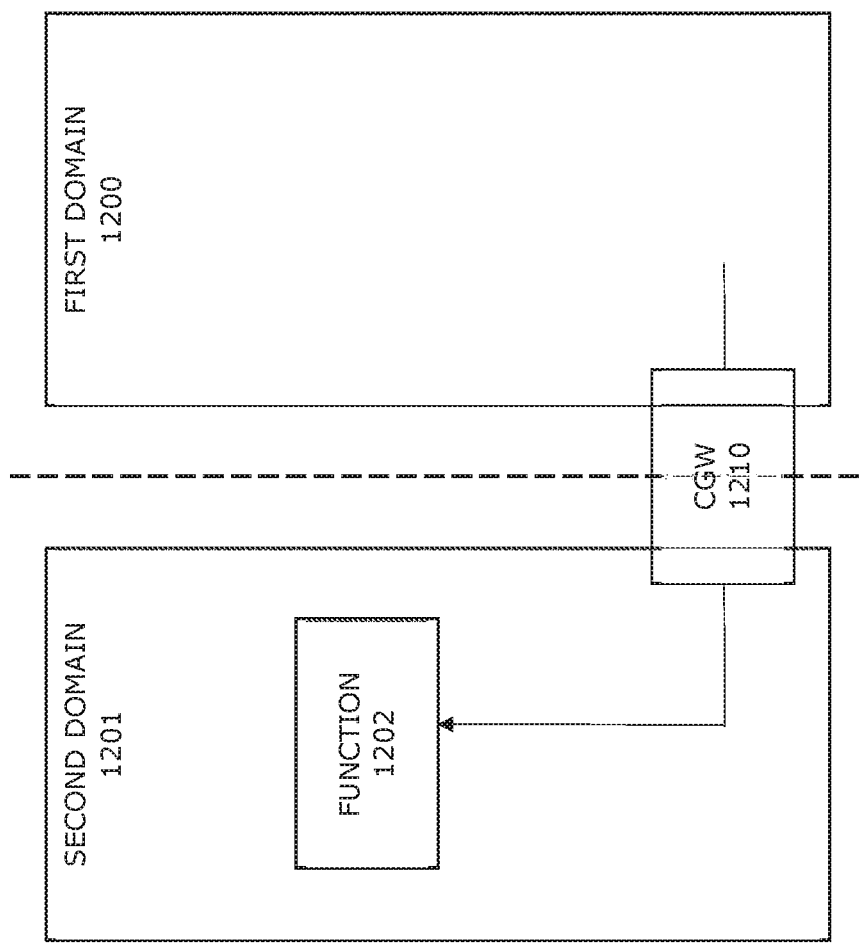
FIG. 11A illustrates schematically a context switch from a first domain to a second domain via a call gateway.

As illustrated in FIG. 11A, a target call gateway 1210 is used to generate a context switch from the currently active execution environment, at a first domain 1200 (source domain), to a second domain 1201 (target domain), such that the required function 1202 can be performed. The target call gateway 1210 restricts the entry point of the caller (source) to performance of the specific function 1202 at the target domain 1201. However, the target call gateway 1210 does not protect the first domain 1200 (source domain). If the target call gateway 1210 does not perform the context switch, for example because it has been corrupted, then the first domain 1200 thinks the switch has happened and stays active without "realizing" it.

Figure 11B:
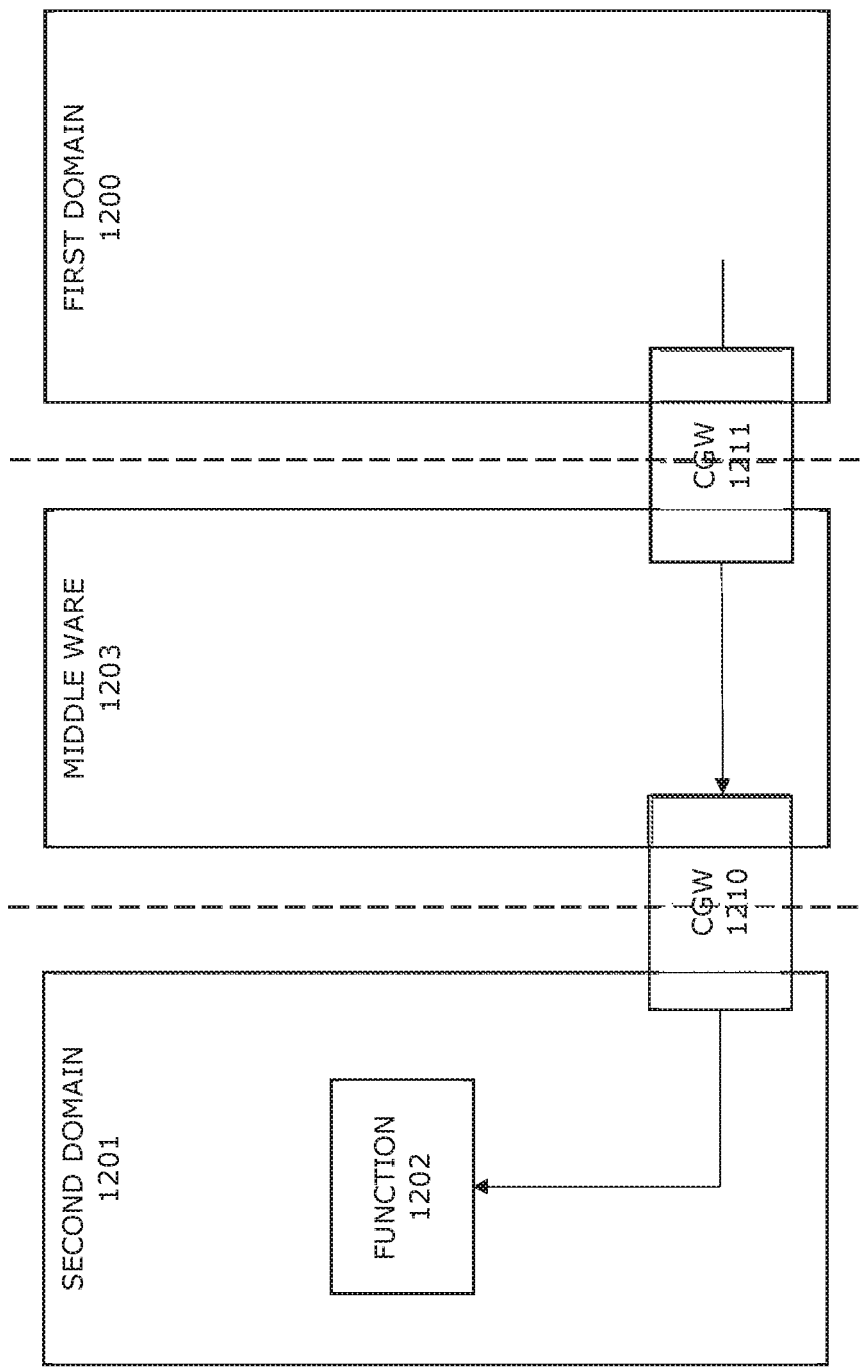
FIG. 11B illustrates schematically a context switch from a first domain to a second domain via two call gateways.

FIG. 11B, illustrates one implementation that solves this problem using two target call gateways 1211, 1210. In FIG. 11B a middleware layer 1203 (generated by the first domain 1200) is provided. The middleware layer 1203 first exits the first domain 1200 via a trusted target call gateway 1211 and then uses a second target call gateway 1210 to switch to the second domain 1201. In the embodiment of FIG. 11B, the source domain 1200 is protected, and even if the target call gateway 1210 does not perform the context switch, the worse that can happen is that the code is stuck in the middleware layer 1203. However, the embodiment of FIG. 11B requires two transition calls (SVC calls) and the switch is slow and error prone, as the first domain is required to generate the middleware layer 1203 which adds a level of indirection.

A different method of protecting the source domain is to provide an exit call gateway. The exit call gateway expresses the requirement to suspend the access privileges of the source domain temporarily and whilst a function is being executed at the target domain, thereby forcing the running code to exit the source domain. In addition, a target call gateway (as described above) can be utilized to express the requirements for performance of the specific function at the target domain, thereby enforcing an entry point to the target domain.

An exit call gateway is different from a target call gateway as it can link to another gateway, such as a target call gateway, and is able to request that the current context is abandoned.

An exit call gateway forces the running code to exit the current (source) domain. In addition, an exit call gateway can also enforce specific exit points from the source domain, as well as just forcing the running code to exit the source domain. Each source domain can have as many exit points as required, a different exit call gateway being provided for each exit point.

Each gateway becomes a reconciliation between an exit call gateway defining an exit point from the source domain and a corresponding target call gateway defining an entry point into the destination domain. It is possible to consider the exit call gateway and the corresponding target call gateway as a pair, defining an exit point and an entry point for a switch from the source domain to the target domain to occur. The reconciliation between an exit call gateway and a corresponding target call gateway can be performed by a supervisor module, such as the monitor described above.

However, as described above, an exit call gateway may not always be required, for example when a context switch is not required, in which case, only a target call gateway is provided. For example, when a first module calls a function in a second module, and the second module performs a secure gateway to its own domain, the first module is effectively exiting its domain. The exit call gateway forces the code to exit the current domain, but it does not preclude other transitions from happening.

An exit call gateway comprises a transition instruction/call together with access parameter(s). According to one embodiment, the exit call gateways access parameters define that the running code is to exit the source domain. However, an exit call gateway can also define exclusive exit points from the source domain. Therefore, the access parameters can define which access privileges of the source domain are/are not being suspended. For example, the exit call gateway can define a list of access privileges which are being suspended and/or a list of access privileges which are not being suspended. The exit call gateway access parameters can also define functions which are allowed to be performed at the source domain, the callee (target) who can perform the function etc., similar to the access parameters described above with reference to the (target) call gateway. For example, the exit call gateway access parameters may include:
  a target ID, such as the unique ID of the target domain/module,
  a target security context ID identifying the security context of the target domain/module,
  a source ID such as the unique ID of the source (calling) domain/module,
  function ID's identifying function(s) which are/are not allowed to be performed,
  access ID's identifying accesses which are/are not allowed to be performed, for example the target domain is or is not allowed access to the stack, and/or the target domain is or is not allowed access to the peripherals,
  privilege ID's identifying access privileges which are not being suspended,
  suspended privileges ID's identifying access privileges which are being suspended, etc.

A supervisor module, such as the monitor, can perform a sanity check comparing one/some/all of the exit call gateway access parameters against the target call gateway access parameters. For example, the monitor could check the exit call gateway target security context ID against the target call gateway security context ID.

The exit call gateway access parameters can also comprise a defined number, as described above. The defined number is always placed at a predetermined position in relation to the transition instruction. The exit call gateway defined number can be the same as or different from the target call gateway defined number. Therefore, it is possible to scan the program code and identify all the exit call gateways, by virtue of identifying the defined number(s) and then determining the position of each exit call gateway in relation to each identified defined number. Once the exit call gateways have been identified, they can be verified at the server.

As stated above, the target call gateway access parameters may include a defined number, a target ID, such as the unique ID of the target domain/module, a source ID such as the unique ID of the source (calling) domain/module, a function ID identifying a function which is allowed to be performed, access ID's identifying accesses which are allowed to be performed etc.

The target call gateway and exit call gateway allow for mutually-distrustful context switching. The target call gateway protects the target domain by enforcing an entry point to the target domain, whilst the exit call gateway protects the source domain by enforcing an exit point from the source domain. For example, an exit call gateway forces privilege reductions upon the running code to temporarily suspend (some of) the access privileges of the source domain and to abandon its execution environment (the source domain) whilst the function is being performed at the target domain. The target call gateway enables the running code to switch to the target domains access permission to perform the function at the target domain. Thus, the running code does not maintain the access privileges of the source domain whilst performing the function at the target domain, unless specifically allowed those privileges by the exit call gateway. According to one embodiment, the target call gateway does not require any knowledge of the exit call gateway.

As discussed above, the code passes via the monitor 320 in order to be provided with the security credentials of the target domain. The monitor 320 also removes/provides the code with the security credentials of the source domain prior to access to the target domain.

The exit call gateway enables, upon return, the source context to be re-activated, since the source domains access privileges are only temporarily suspended for the duration of the performance of the function at the target domain. When the running code returns to the source domain, the source domains access privileges are reinstated by the monitor.

An exit call gateway is advantageous in a mutually distrustful environment where both the target domain and the source domain have the same privilege level but different access permissions.

The reconciliation between the target call gateway and the exit call gateway is mediated by a supervisor module, such as ARM's® uVisor. The supervisor module checks the format of the target call gateway, the exit call gateway, and the access parameters defined in the call gateways. The access parameters can be defined in ACLs. However, the supervisor module can also reconcile other parameters such as box identifiers for the target/source context, the called function address etc. Essentially all possible call gateway parameters can be reconciled. The supervisor module then performs a single context switch, with a single transition call, such as an SVC call, from the source context to the target context and sets the return register after the location of the exit call gateway. The exit call gateway and the corresponding target call gateway act as a pair.

Figure 12:
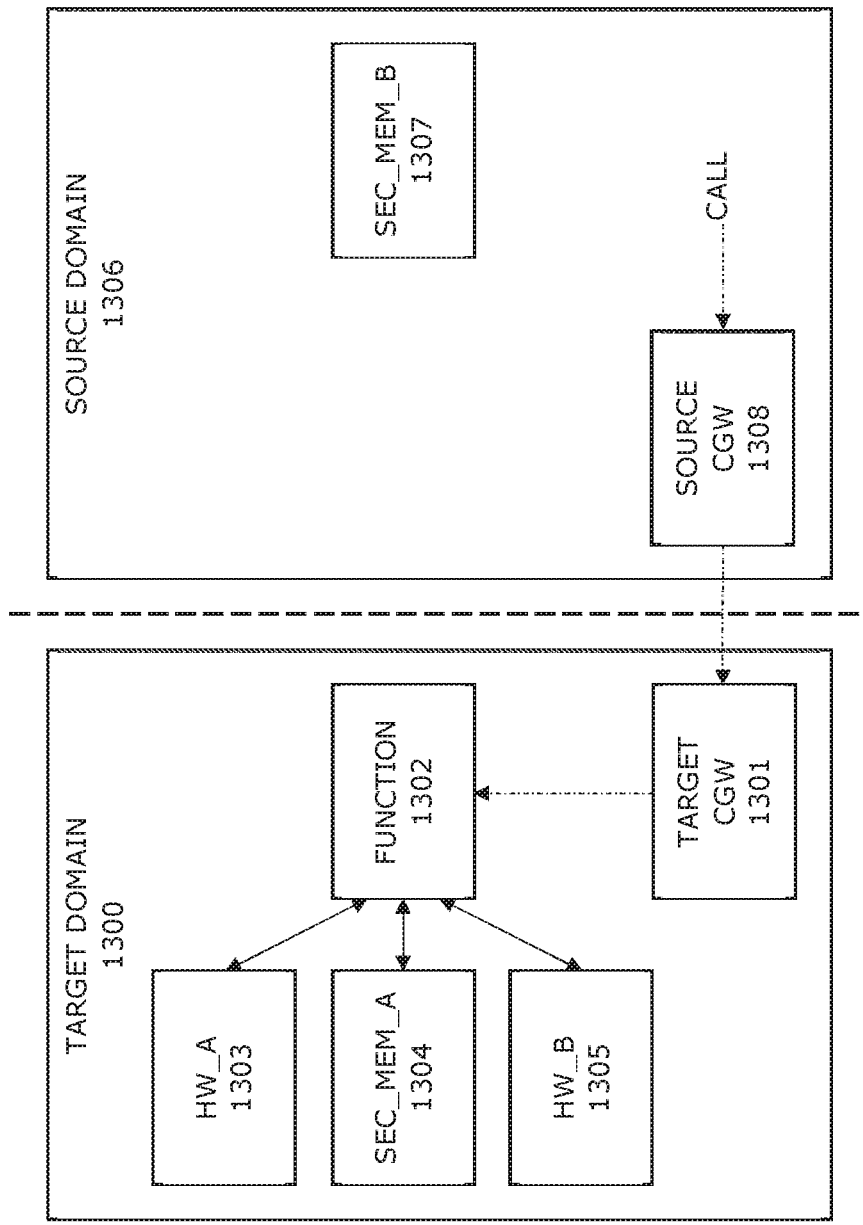
FIG. 12 illustrates schematically a context switch from a first domain to a second domain via an exit call gateway and a target call gateway.

FIG. 12, illustrates a target call gateway 1301 which is used to generate a context switch from the currently active execution environment, at the source domain 1306 to the target domain 1300, such that the required function 1302 can be performed. The target call gateway 1301 restricts the entry point to performance of the specific function 1302. The source domain 1306 is provided with an exit call gateway 1308 which temporarily suspends the access privileges of the source domain whilst the function 1302 is being performed at the target domain 1300. The exit call gateway 1308 enforces an exit point of the caller (source) from the source domain 1306. However, the exit call gateway 1308 also allows performance of a specific function, such as access to the secure memory 1307 of the source domain 306 by the target, so that the function 1302 can be completed.

Figure 13:
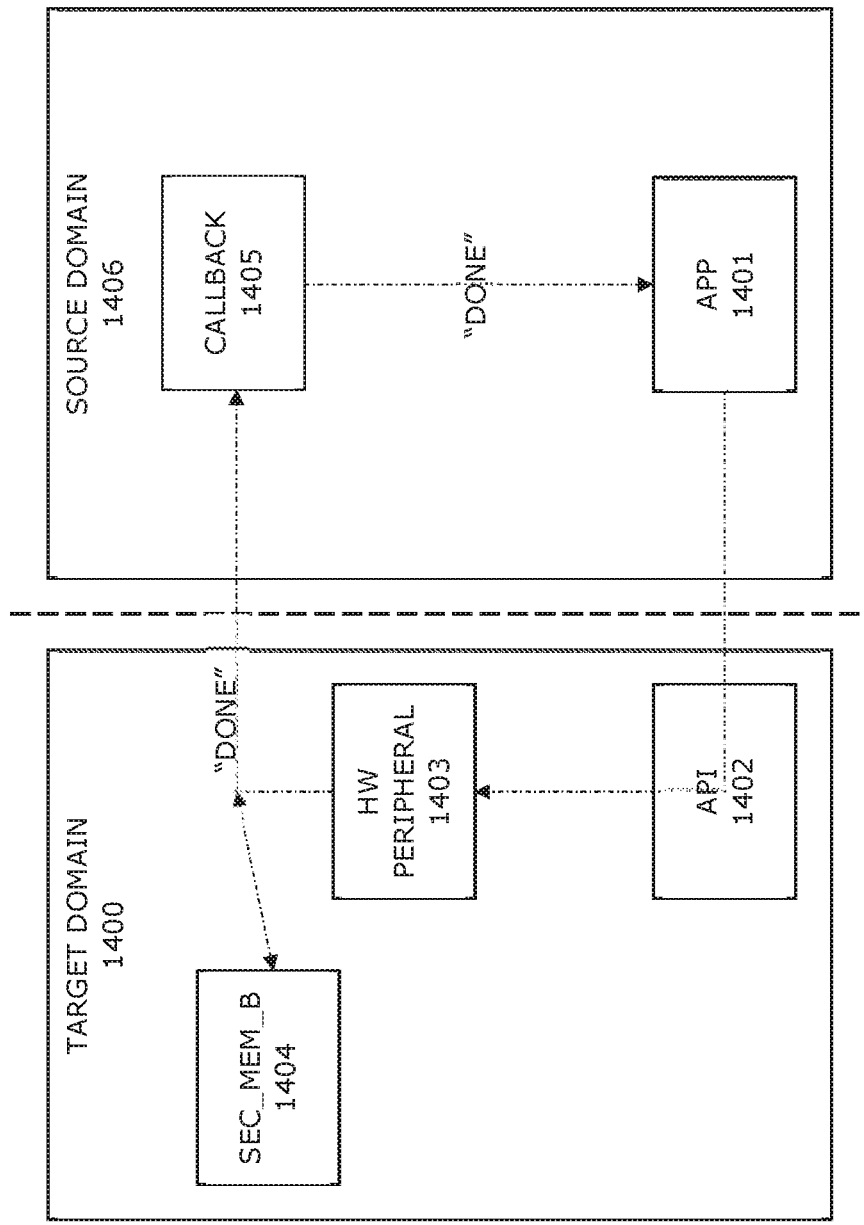
FIG. 13 illustrates schematically a first domain and a second domain.

Some of the access parameters of the exit call gateway may be dynamic. A dynamic call gateway parameter is a parameter which can be altered. Consequently, dynamic parameters are any parameters that can go in any modifiable memory. For example, a dynamic parameter could be a pointer to a modifiable memory location (e.g. SRAM). In addition, a dynamic parameter could be general purpose register, since general purpose registers can be used to hold the arguments to a function call. An exit call gateway is not required to include dynamic parameters, and an exit call gateway which is stored in read only memory, only has static (i.e. unalterable) parameters. However, it is possible for an exit call gateway to have at least one static (i.e. unalterable) parameter stored in read only memory, as well as dynamic (i.e. alterable) parameters stored in modifiable memory (e.g. SRAM). As stated above, the target call gateway comprises static access parameters, i.e. the access parameters cannot be altered. One example of a dynamic parameter of an exit call gateway, is a call back parameter. With reference to FIG. 13, when the application module 1401 was written, the identity of the domain into which the application module 1401 would be installed was not known. Therefore, the ID of the call back resource 1405 was not known. As a result, the call back parameter of the exit call gateway is provided as a dynamic parameter. Following installation of the application 1401, the call back parameter of the exit call gateway 1408 of the application is dynamically updated to include the call back ID/address of the domain 1406 into which the application has been installed. The exit call gateway 1408 defines that the target is allowed to access the source domains call back resource 1405 to provide a "done" message when the function defined in the target call gateway 1407 has been performed. The call back parameter of the exit call gateway 1408 is considered to be dynamic as it can be altered. However, some or all of the other parameters of the exit call gateway can be static.

The more parameters of an exit call gateway which are dynamic, then the harder it is to establish/maintain the security of the exit call gateway. This is because for every dynamic parameter which is defined for an exit call gateway, it is difficult to prevent a malicious attacker from also dynamically changing that parameter.

One or more of the parameters of a target call gateway can define whether to accept incoming calls from an exit call gateway which has dynamic parameters. A parameter of a target call gateway can define that the target call gateway will not accept incoming calls from an exit call gateway which has one, or more, dynamic parameters. One or more of the parameters of a target call gateway can define which parameter(s) of an exit call gateway the target call gateway will accept as dynamic. One or more of the parameters of a target call gateway can define which parameter(s) of an exit call gateway the target call gateway requires to be static.

Static parameters of a target call gateway and an exit call gateway are considered to be critical. For example, some parameters may not be critical, such as an ID parameter, as discussed above, whereas other parameters such as what function is to be performed at the target module may be considered critical, in which case, the ID parameter may be dynamic, whilst the function parameter is static.

According to another embodiment, an entry call gateway can be provided instead of a target call gateway, the entry call gateway expresses the requirements for performance of the specific function at the target domain, thereby enforcing an entry point to the target domain. An entry call gateway only differs from a target call gateway in that an entry call gateway may have at least one dynamic parameter, i.e. is a parameter which can be altered. However, some or all of the other parameters of the entry call gateway can be static, i.e. static parameters cannot be altered. When one or more of the parameters of a target call gateway is dynamic, then the target call gateway is considered to be an entry call gateway, or to put it another way, a target call gateway is an entry call gateway having only static parameters. The security of a target call gateway can be fully verified because all of its parameters are static, whereas the security of an entry call gateway cannot be fully verified because an entry call gateway has at least one dynamic parameter.

It is possible for both the exit call gateway and an entry call gateway to have dynamic parameters (via registers or pointers to SRAM locations/untrusted memories).

The entry call gateway and the exit call gateway allow for mutually-distrustful context switching. The entry call gateway protects the target domain by enforcing an entry point to the target domain, whilst the exit call gateway protects the source domain by enforcing an exit point from the source domain.

The reconciliation between the entry call gateway and the exit call gateway is mediated by the supervisor module, such as ARM®'s uVisor® or any other hypervisor for mutually distrustful secure environments. As will be discussed in further detail below with reference to FIG. 15, the running code encounters the exit call gateway transition instruction, which initiates the transition from the source domain to the target domain. The running code does not "directly" encounter the target/entry call gateway transition instruction. Consequently, the supervisor module performs a single context switch, with a single transition instruction/SVC call from the source to the target domain. The supervisor module, such as the monitor, detects the first call gateway (the exit call gateway) as part of the first transition instruction, and according to one embodiment, follows the static or dynamic parameter pointer to detect the second call gateway (target/entry call gateway). Instead of returning from the first call gateway (the exit call gateway) it will reconcile both gateways and execute the combination of both actions and then return as if from the second call gateway, as if the exit call gateway and the target/entry call gateway were executed separately.

As with the exit call gateway, the more parameters of the entry call gateway which are dynamic, then the harder it is to establish/maintain the security of the entry call gateway.

The target/entry call gateway access parameters can also include a dynamic parameter ID and/or a static parameter ID. The dynamic parameter ID identifies which parameters of an exit call gateway the target/entry call gateway will accept as dynamic. The static parameter ID identifies which parameters of an exit call gateway the target/entry call gateway requires to be static. Furthermore, exit call gateway access parameters can also include a dynamic parameter ID and/or a static parameter ID. The dynamic parameter ID identifies which parameters of an entry call gateway the exit call gateway will accept as dynamic. The static parameter ID identifies which parameters of a target/entry call gateway the exit call gateway requires to be static.

Static parameters of an entry call gateway and an exit call gateway are considered to be critical.

As stated above, each source domain can have as many exit points as required, a different exit call gateway being provided for each exit point. In addition, each target domain can have as many entry points as required, a different target/entry call gateway being provided for each entry point. The supervisor module performs the reconciliation between an exit call gateway defining an exit point from the source domain and a corresponding target/entry call gateway defining an entry point into the destination domain.

The supervisor module:
reads the exit call gateway from the trusted memory;
reads the target ID of the exit call gateway, which is a target/entry call gateway;
reads the target/entry call gateway;
if the target/entry call gateway is found, the supervisor module checks that the constraints of the two gateways (the exit call gateway and the target/entry call gateway) match up, for example it checks that the restrictions on static/dynamic parameters are satisfied; it checks that the ACLs of the two domains allow to perform the transition, etc.
if all checks pass, it saves the state of the currently active (source) domain in order to restore them later;
it switches from the currently active (source) domain to the target domain.

The reconciliation between the exit call gateway and the corresponding target/entry call gateway checks that the two gateways are compatible with each other in terms of parameters and permissions (ACLs, resource sharing, resource subletting, etc.). According to one embodiment, the reconciliation not only passively checks that two gateways are compatible, but also merges both sets of access parameters. For example, the source module sharing/subletting some memory with the target module as part of the call.

It is possible to consider the exit call gateway and the corresponding target/entry call gateway as a pair creating an overall gateway from the source domain to the target domain, since both an exit point and an entry point are utilized for a switch from the source domain to the target domain to occur.

It is possible to map one exit call gateway to one target/entry call gateway; many different exit call gateways to one target/entry call gateway, one exit call gateway to many different target/entry call gateways; and many different exit call gateways to many different target/entry call gateways. The many different exit call gateways define different exit points from the source domain, and the many different target/entry call gateways define different entry points to the destination domain. Each pair of exit call gateway and target/entry call gateway create an overall gateway.

The table below represents the different relationships which are possible.

| Source | Destination/target | |
|---|---|---|
| One exit call gateway | One target/entry call gateway | A gateway between a specific exit point from the source domain and a specific entry point to the destination domain. A gateway of this type is represented by the pair: (specific_src_exit_point, specific_dst_entry_point) |
| Many exit call gateways | One target/entry call gateway | A gateway between any exit point from the source domain and a specific entry point in the destination domain: A gateway of this type is represented by the pair: (*, specific_dst_entry_point) |
| One exit call gateway | Many target/entry call gateways | A gateway between a specific exit point from the source domain and any entry point in the destination domain: A gateway of this type is represented by the pair: (specific_src_exit_point, *) |
| Many exit call gateways | Many target/entry call gateways | A gateway between any exit point from the source domain and any entry point in the destination domain: A gateway of this type is represented by the pair: (*, *) |

According to one embodiment, an access control list(s) can be provided that maps each pair of exit call gateway and corresponding target/entry call gateway to create each overall gateway. It is also possible to use an access control list(s) to restrict pairings that are not allowed.

Each secure domain can have as many entry/exit points as required.

According to one embodiment, a static target/entry call gateway is provided at a target domain and a static exit call gateway is provided at a source domain. According to one embodiment, a static target/entry call gateway is provided at a target domain and a dynamic exit call gateway (at least one of the parameters being dynamic) is provided at a source domain. According to one embodiment, a dynamic entry call gateway (at least one of the parameters being dynamic) is provided at a target domain and a static exit call gateway is provided at a source domain. According to one embodiment, a dynamic entry call gateway (at least one of the parameters being dynamic) is provided at a target domain and a dynamic exit call gateway (at least one of the parameters being dynamic) is provided at a source domain. A static call gateway has only static parameters and a dynamic call gateway has at least one dynamic parameter. As stated above, the more dynamic parameters present, the less robust the security solution.

The parameters of the exit call gateway can define which resources, such as the memory or a region of the memory, at the source domain are accessible to the target domain. The parameters of the exit call gateway can delegate to the target domain access to a subset of the secure memory owned by the source domain (for example, "of the 40 k memory the source domain owns, the source domain is giving the target domain access to 64 bytes—that access is valid for the duration of the call"). According to one embodiment, the parameters of the exit call gateway define the address(es) of the resources that are accessible to the target domain. The parameters of the exit call gateway can define which resources, such as the memory or a region of the memory, at the source domain are not accessible to the target domain. According to one embodiment, the access parameters of the exit call gateway can also comprise the address(es) of the resources that are not accessible to the target domain. The parameters of the exit call gateway can define that the target domain is or is not allowed access to the stack. The parameters of the exit call gateway can define that the target domain is or is not allowed access to the peripherals. The parameters of the exit call gateway can define which functions the target domain is or is not permitted to perform in relation to the permissible accesses.

According to one embodiment, the target domain can allow other domains of the system to access resources and/or perform functions at the source domain when those specific accesses and/or functions are defined in the parameters of an exit call gateway. The source domain can delegate permission(s) defined in the exit call gateway to the target domain. The delegated permissions are identified in said exit call gateway with a delegate ID. The target domain can then sublet the accesses and/or functions which are defined in the parameters of the exit call gateway as being delegable.

For example, an exit call gateway allows a target domain to access the entire memory region at the source domain to perform function X. The target domain can then "sublet" the resources of the exit call gateway, to allow another domain of the system to access the entire memory region at the source domain to perform function X. The target domain cannot sublet accesses and/or functions which are not defined in the parameters of the exit call gateway. In addition, the parameters defined in the exit call gateway cannot be expanded. For example, when the exit call gateway allows the target domain to access a region of the memory at the source domain to perform function X, the target domain cannot sublet access to the entire memory region at the source domain to perform function X.

However, the target domain can refine which accesses and/or functions are sublet. For example, the exit call gateway allows the target domain to access the entire memory region at the source domain to perform function X. The target domain can then "sublet" the resources of the exit call gateway (i.e. access the entire memory region at the source domain), to allow another domain to access part of the memory region at the source domain to perform function X. The successive accesses can be permitted via another call gateway or via any other suitable mechanism provided by the operating system/supervisor module. If the target domain attempts to "sublet" accesses and/or functions which are not defined in the parameters of the exit call gateway, then a fault is captured by the supervisor module.

Figure 14:
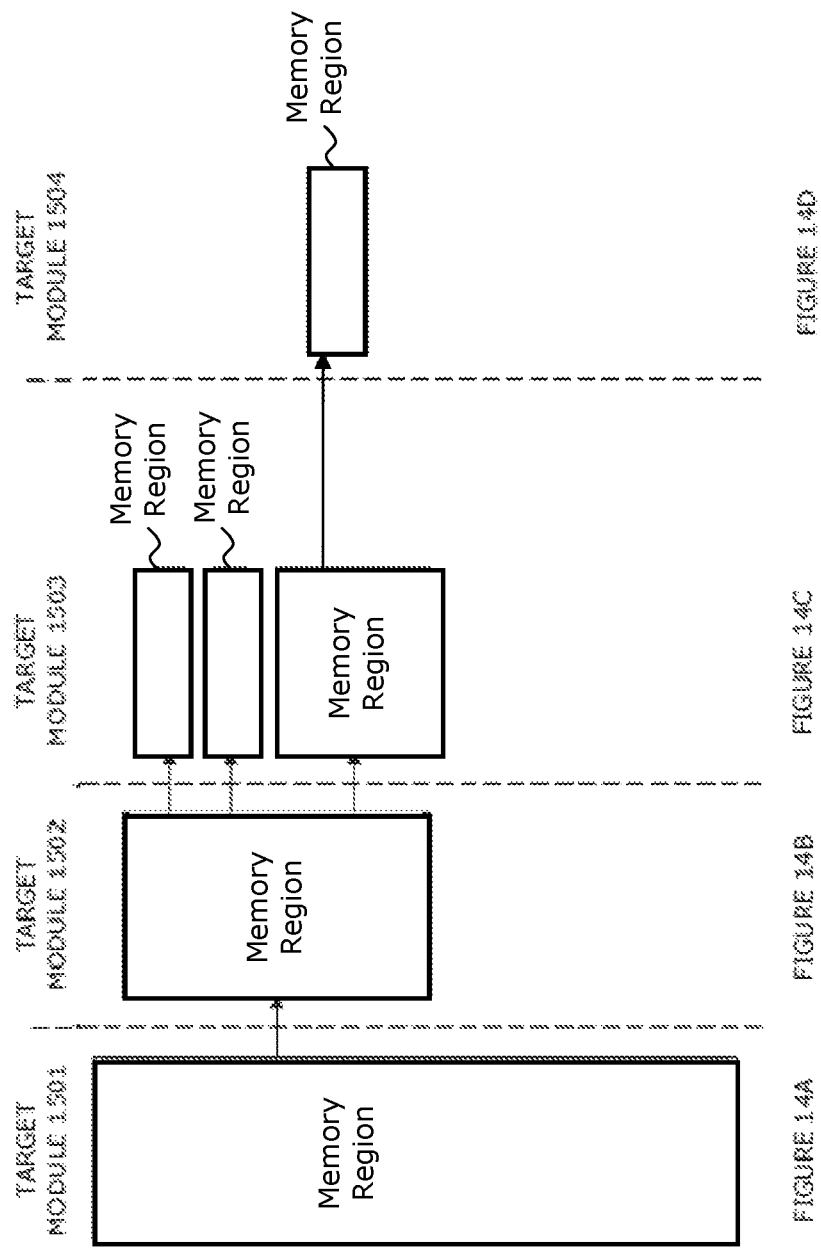
FIG. 14 illustrates schematically the subletting of accesses defined in the parameters of an entry/exit call gateway.

FIGS. 14A to 14D illustrates schematically the subletting of accesses defined in the parameters of an entry/exit call gateway. FIG. 14A illustrates that access to the entire memory region of a source domain to perform function X is allowed by an exit call gateway. FIG. 14B illustrates schematically that target domain 1501 has sublet and refined the access, granting access to target domain 1502 to a reduced area of the memory region of the source domain to perform function X. FIG. 14C illustrates schematically that target domain 1502 has sublet and refined the access, granting access to target domain 1503 to a further reduced area of the memory region of the source domain to perform function X. It is also possible for target domain 1501 to sublet and refine the access, granting access to target domain 1503 to a further reduced area of the memory region of the source context to perform function X. FIG. 14D illustrates schematically that target domain 1503 has sublet and refined the access, granting access to target domain 1504 to a further reduced area of the memory region of the source domain to perform function X. It is also possible for target domain 1501 or target domain 1502 to sublet and refine the access, granting access to target domain 1504 to a further reduced area of the memory region of the source domain to perform function X.

For static parameters the subletting process can be performed once during startup/firmware update, but not during runtime.

According to one embodiment, the parameters of an exit call gateway can be stored in an access control list (ACL). According to one embodiment, parameters of the exit call gateway can define whether or not the exit call gateway is allowed to be sublet to target domains. According to one embodiment, parameters of the exit call gateway can define specific domains, groups of domains, and/or execution streams to whom the exit call gateway can be sublet. According to one embodiment, parameters of the exit call gateway can define specific call gateways, groups of call gateways, and/or execution streams to whom the exit call gateway cannot be sublet.

According to one embodiment, the parameters of a target/entry call gateway can be stored in an access control list (ACL). According to one embodiment, parameters of the target/entry call gateway can define whether or not the target/entry call gateway is allowed to be sublet to source domains. According to one embodiment, parameters of the target/entry call gateway can define specific domains, groups of domains, and/or execution streams to whom the target/entry call gateway can be sublet. According to one embodiment, parameters of the target/entry call gateway can define specific call gateways, groups of call gateways, and/or execution streams to whom the target/entry call gateway cannot be sublet.

The exit call gateway provided at the source domain is aware of the call gateway at the target domain. According to one embodiment, the exit call gateway includes a parameter indicating the entry call gateway/target call gateway, for example a target/entry gateway ID. The entry call gateway/target call gateway provided at the target domain is not required to be aware of the exit call gateway provided at the source domain. However, according to one embodiment, the entry call gateway/target call gateway includes a parameter indicating that an incoming call from the source domain uses the identified exit call gateway, for example the target access parameters include an exit gateway ID.

Figure 15:
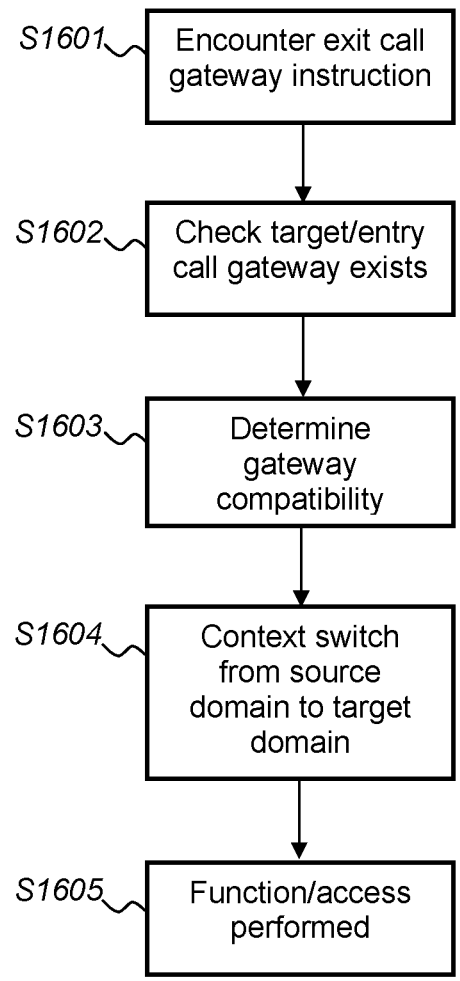
FIG. 15 illustrates schematically a process for protecting a target domain and a source domain from unauthorized accesses.

FIG. 15 is a flow diagram schematically illustrating a process for protecting a target domain and a source domain from unauthorized accesses. At step S1601 the running code encounters an exit call gateway transition instruction identifying an exit call gateway. The exit call gateway comprises the exit transition instruction and at least one exit access parameter. The exit call gateway requires the running code to exit the current (source) domain before doing any other call, and the exit access parameters define an exit point from the source domain. At step S1602 the supervisor module checks that a counterpart for the exit call gateway exist, i.e. the supervisor module identifies a target/entry call gateway corresponding to the exit call gateway. As stated above, according to one embodiment, an access control list(s) can be provided that maps each pair of exit call gateway and corresponding target/entry call gateway to create each overall gateway. The entry call gateway comprises a transition instruction and at least one entry access parameter, the entry access parameters defining an access point to the target domain. At step S1603, when a corresponding target/entry call gateway exists, then the supervisor module determines whether the constraints of the exit call gateway and corresponding the target/entry call gateway, defined in the access parameters of the two gateways, are compatible with each other. For example, in its simplistic form, an access parameter of the exit call gateway could define a target ID, which is the ID of the corresponding target/entry call gateway, and an access parameter of the entry call gateway could define a source ID, which is the ID of the corresponding exit call gateway, such that the two gateways are compatible with each other. When a corresponding target/entry call gateway, corresponding to the exit call gateway does not exists, then an error message is generated. When the constraints of the exit call gateway and corresponding the target/entry call gateway are compatible with each other, then at step S1604 the context switch from the source domain to the target domain is performed, such that the constraints defined in the exit access parameters and the target entry access parameters are complied with. According to one embodiment, the monitor determines that the target call gateway and exit call gateway are stored in trusted memory and the constraints defined in the exit access parameters and the target/entry access parameters are complied with. The monitor applies the appropriate security credentials (the security credentials required at the target domain) to the processing circuitry (the code, data, and hardware peripherals) transitioning from the source domain to the target domain. In addition, when defined in the exit call gateway, access privilege(s) to the source domain are suspended, by the monitor. When the constraints of the exit call gateway and corresponding the target/entry call gateway are not compatible with each other, then an error message is generated. At step S1605, following completion, at the target domain, of the function/access defined in the target access parameters the context switch from the target domain to the source domain is performed. The monitor removes the applied security credentials from the processing circuitry (the code, data, and hardware peripherals). In addition, when defined in the exit call gateway, the monitor reactivates the access privilege(s) to the source domain.

Even though both the exit call gateway and the entry call gateway have their own individual transition instructions, since the running code encounters the exit call gateway transition instruction, which initiates the transition from the source domain to the target domain, the running code does not "directly" encounter the target/entry call gateway transition instruction. Consequently, the process only requires one round of system calls, not two. The monitor recognizes the pairing and executes both transitions in one single operation. According to a further embodiment, it is possible for two or more call gateways in a chain of call gateways to be reconciled.

The combination of an exit call gateway and a target/entry call gateway allows mutually-distrustful context switching to occur that results in the same level of execution privilege (privileged/unprivileged/thread mode/exception mode). Known execution environments can only either choose to escalate its privileges (system call) or to release its current execution privileges in favour of a new context. The new context described sits at a different privileged level in existing solutions.

As stated above with reference to the call gateways, the exit call gateways and target/entry call gateways are stored in a trusted memory. The monitor checks whether the exit call gateway and the target/entry call gateway are stored in a trusted memory, and when the exit call gateway and the target/entry call gateway are stored in a trusted memory, the monitor provides the required security credentials for the required access. However, when either or both of the exit call gateway and the target/entry call gateway are not stored in a trusted memory, the monitor does not provide the required security credentials for the required access—a security violation is indicated.

As will be appreciated by one skilled in the art, the present techniques may be embodied as a system, method or computer program product. Accordingly, the present techniques may take the form of an entirely hardware embodiment, an entirely software embodiment, or an embodiment combining software and hardware.

Furthermore, the present techniques may take the form of a computer program product embodied in a computer readable medium having computer readable program code embodied thereon. The computer readable medium may be a computer readable signal medium or a computer readable storage medium. A computer readable medium may be, for example, but is not limited to, an electronic, magnetic, optical, electromagnetic, infrared, or semiconductor system, apparatus, or device, or any suitable combination of the foregoing.

Computer program code for carrying out operations of the present techniques may be written in any combination of one or more programming languages, including object oriented programming languages and conventional procedural programming languages.

For example, program code for carrying out operations of the present techniques may comprise source, object or executable code in a conventional programming language (interpreted or compiled) such as C, or assembly code, code for setting up or controlling an ASIC (Application Specific Integrated Circuit) or FPGA (Field Programmable Gate Array), or code for a hardware description language such as Verilog™ or VHDL (Very high speed integrated circuit Hardware Description Language).

The program code may execute entirely on the user's computer, partly on the user's computer and partly on a remote computer or entirely on the remote computer or server. In the latter scenario, the remote computer may be connected to the user's computer through any type of network. Code components may be embodied as procedures, methods or the like, and may comprise sub-components which may take the form of instructions or sequences of instructions at any of the levels of abstraction, from the direct machine instructions of a native instruction set to high-level compiled or interpreted language constructs.

It will also be clear to one of skill in the art that all or part of a logical method according to the preferred embodiments of the present techniques may suitably be embodied in a logic apparatus comprising logic elements to perform the steps of the method, and that such logic elements may comprise components such as logic gates in, for example a programmable logic array or application-specific integrated circuit. Such a logic arrangement may further be embodied in enabling elements for temporarily or permanently establishing logic structures in such an array or circuit using, for example, a virtual hardware descriptor language, which may be stored and transmitted using fixed or transmittable carrier media.

In one alternative, an embodiment of the present techniques may be realized in the form of a computer implemented method of deploying a service comprising steps of deploying computer program code operable to, when deployed into a computer infrastructure or network and executed thereon, cause said computer system or network to perform all the steps of the method.

In a further alternative, the preferred embodiment of the present techniques may be realized in the form of a data carrier having functional data thereon, said functional data comprising functional computer data structures to, when loaded into a computer system or network and operated upon thereby, enable said computer system to perform all the steps of the method.

It will be clear to one skilled in the art that many improvements and modifications can be made to the foregoing exemplary embodiments without departing from the scope of the present techniques.

As will be appreciated from the foregoing specification, techniques are described providing machine implemented methods for protecting a target domain and a source domain from unauthorized accesses. Thereby increasing the security of the overall system.

In embodiments, performing said context switch from said source domain to said target domain comprises applying security credentials to code, data, and hardware peripherals transitioning from said source domain to said target domain to enable completion of a function and/or an access defined in said entry access parameters at said target domain. Thereby only predefined accesses are allowed increasing the security of the overall system.

In embodiments, said method further comprises: performing a context switch from said target domain to said source domain following completion of said function and/or said access defined at said target domain. Following completion of a function and/or an access, the running code is required to leave the target domain increasing the security of the overall system—no other none-predefined function and/or an access can be performed.

In embodiments, performing said context switch from said target domain to said source domain comprises removing said security credentials from said code transitioning from said target domain to said source domain following completion of said function and/or said access at said target domain. The access privileges which are granted in the target domain are removed when leaving the target domain increasing the security of the overall system.

In embodiments, performing said context switch from said source domain to said target domain comprises suspending at least one access privilege to said source domain defined in said exit access parameters. The access privileges of the source domain are temporarily suspended when access the target domain, protecting the source domain from the target domain.

In embodiments, said method further comprises: performing a context switch from said target domain to said source domain following completion of a function and/or an access defined in said entry access parameters at said target domain. Thereby only predefined accesses are allowed increasing the security of the overall system.

In embodiments, performing said context switch from said target domain to said source domain comprises reactivating said suspended access privilege following completion of said function and/or said access defined in said entry access parameters at said target domain. The suspended privileges are reactivated.

In embodiments, said method further comprises: performing a context switch from said target domain to said source domain following completion of a function and/or an access defined in said entry access parameters at said target domain. Thereby only predefined accesses are allowed increasing the security of the overall system.

In embodiments, said method further comprises: denying said context switch from said source domain to said target domain when said exit access parameters and/or said entry access parameters are not complied with. When the requested access is not permitted, the context switch is denied, increasing the security of the overall system.

In embodiments, said method further comprises: mapping said exit call gateway to said corresponding entry call gateway.

In embodiments, said method further comprises: defining a plurality of exit call gateways; and mapping each of said plurality of exit call gateways to said corresponding entry call gateway. The efficiency of the system can be increased by mapping different exits from the source domain to one entrance at the target domain.

In embodiments, said method further comprises: defining a plurality of entry call gateways; and mapping each of said plurality of entry call gateways to said corresponding exit call gateway. The efficiency of the system can be increased by mapping one exit from the source domain to different entrances to the target domain.

In embodiments, said method further comprises: defining a plurality of entry call gateways and a plurality of exit call gateways; and mapping each of said plurality of exit call gateways to at least one of said plurality of corresponding entry call gateways. The efficiency of the system can be increased by mapping multiple exits from the source domain to multiple different entrances to the target domain.

In embodiments, said method further comprises: providing at least one access control list identifying said exit call gateway mapped to said corresponding entry call gateway.

In embodiments, said method further comprises: preventing said exit call gateway from being mapped to one or more of said entry call gateways when said one or more of said entry call gateways does not correspond to said exit call gateway.

In embodiments, said method further comprises: preventing said entry call gateway from being mapped to one or more of said exit call gateways when said one or more of said exit call gateways does not correspond to said entry call gateway. Only predefined combinations of exits and entrances are allowed, increasing the security of the overall system.

In embodiments, said entry access parameters comprise at least one of: a target ID, a source ID, a function ID, an access ID, a defined number, a dynamic parameter ID, a static parameter ID, an exit gateway ID.

In embodiments, said entry call gateways are stored in secure memory. Thereby preventing the entry call gateways from being altered.

In embodiments, said entry call gateway comprises one or more static entry access parameters. Thereby preventing the entry call gateways from being altered.

In embodiments, said exit access parameters comprise at least one of: a target ID, a source ID, a function ID, an access ID, a privilege ID, a suspended privilege ID, a defined number, a dynamic parameter ID, a static parameter ID, a delegate ID, a target gateway ID.

In embodiments, said exit call gateway is stored in secure memory. Thereby preventing the exit call gateways from being altered.

In embodiments, said exit call gateway comprises one or more static exit access parameters. Thereby preventing the exit call gateways from being altered.

In embodiments, said exit call gateway comprises one or more dynamic exit access parameters. Allowing more flexibility to alter parameters which are not considered critical.

In embodiments, said entry call gateway comprises an target call gateway, said target call gateway comprising only static exit access parameters. Allowing more flexibility to alter parameters which are not considered critical.

In embodiments, said target domain delegates one or more of said accesses defined in said exit access parameters to another target domain. Enabling the system to have more flexibility without comprising security.

In embodiments, said exit call gateway comprises a delegate ID indicating that said delegated access is/is not permitted. Enabling the system to have more flexibility without comprising security.

In embodiments, said target domain refines said delegation of said one or more of said accesses to a portion of said accesses. Enabling the system to have more flexibility without comprising security.

In embodiments, said another target domain delegates said delegated accesses defined in said exit access parameters to a further target domain.

In embodiments, said delegations are defined in a call gateway access parameter.

In embodiments, said entry access parameters and/or said exit access parameters are stored in an access control list.

In embodiments, the method further comprises: determining that said exit call gateway is stored in a trusted storage device; determining that said entry call gateway is stored in a trusted storage; and performing said context switch from said source domain to said target domain following determination that said exit call gateway and said entry call gateway are stored in said trusted storage device.

The invention claimed is:

1. A machine implemented method for protecting a target domain and a source domain from an unauthorized context switch from said source domain to said target domain, the method comprising:
   identifying an exit call gateway comprising an exit transition instruction and at least one exit access parameter, said exit access parameters restricting exit of code from said source domain;
   identifying an entry call gateway corresponding to said exit call gateway, said entry call gateway comprising a transition instruction and at least one entry access parameter, said entry access parameters restricting access of the code to said target domain;
   determining that said exit access parameters and said entry access parameters are compatible with each other; and
   performing a context switch from said source domain to said target domain, when said exit access parameters and said entry access parameters are complied with, wherein performing said context switch from said source domain to said target domain comprises applying security credentials to the code transitioning from said source domain to said target domain to enable completion of a function and/or an access defined in said entry access parameters at said target domain; and
   denying said context switch from said source domain to said target domain when said exit access parameters and/or said entry access parameters are not complied with.

2. The machine implemented method of claim 1, further comprising: performing a context switch from said target domain to said source domain following completion of said function and/or said access at said target domain.

3. The machine implemented method of claim 2, wherein performing said context switch from said target domain to said source domain comprises removing said security credentials from said code transitioning from said target domain to said source domain following completion of said function and/or said access at said target domain.

4. The machine implemented method of claim 3, wherein performing said context switch from said source domain to said target domain comprises suspending at least one access privilege to said source domain defined in said exit access parameters.

5. The machine implemented method of claim 4, further comprising:
   performing a context switch from said target domain to said source domain following completion of a function and/or an access defined in said entry access parameters at said target domain.

6. The machine implemented method of claim 5, wherein performing said context switch from said target domain to said source domain comprises reactivating said suspended access privilege following completion of said function and/or said access defined in said entry access parameters at said target domain.

7. The machine implemented method of claim 1, further comprising:
   performing a context switch from said target domain to said source domain following completion of a function and/or an access defined in said entry access parameters at said target domain.

8. The machine implemented method of claim 1, further comprising: mapping said exit call gateway to said corresponding entry call gateway.

9. The machine implemented method of claim 1, wherein said entry call gateway comprises one or more static entry access parameters.

10. The machine implemented method of claim 1, wherein said exit call gateways comprises one or more static exit access parameters.

11. The machine implemented method of claim 1, wherein said exit call gateways comprises one or more dynamic exit access parameters.

12. The machine implemented method of claim 1, wherein said entry call gateway comprises a target call gateway, said target call gateway comprising only static exit access parameters.

13. The machine implemented method of claim 1, wherein said target domain delegates, as a delegation, one or more of said accesses defined in said exit access parameters to another target domain.

14. The machine implemented method of claim 13, wherein said target domain refines said delegation to a portion of said accesses.

15. The machine implemented method of claim 1, further comprising:
   determining that said exit call gateway is stored in a trusted storage device;
   determining that said entry call gateway is stored in a trusted storage device; and
   performing said context switch from said source domain to said target domain following determination that said exit call gateway and said entry call gateway are stored in said trusted storage device.

16. A data processing apparatus comprising:
   processing circuitry configured to perform processing functions in response to program instructions, said processing circuitry comprising a target domain, a source domain and a monitor, wherein said monitor is arranged to apply security credentials to said processing circuitry transitioning from said source domain to said target domain to enable said processing circuitry to perform functions in said target domain, and a trusted storage device for storing at least one entry call gateway and at least one exit call gateway, said entry call gateways comprising a transition instruction and entry access parameters restricting access of code to said target domain, and said exit call gateways comprising a transition instruction and exit access parameters restricting exit of the code from said source domain, said monitor being further arranged to:

determine when an exit call gateway is stored in said trusted storage device in response to a transition instruction, and following determination that said exit call gateway is stored in said trusted storage device, suspending at least one access privilege to said source domain defined in said exit access parameters;

determine when a target call gateway is stored in said trusted storage device in response to a transition instruction, and following determination that said target call gateway is stored in said trusted storage device, applying said security credentials to said processing circuitry, so that said processing circuitry can perform a target function in said target domain, said entry access parameters comprising said target function; and determine when said exit access parameters and/or said entry access parameters are not complied with, and following a determination that said exit access parameters and/or said entry access parameters are not complied, denying said processing circuitry to performing the target function in said target domain.

17. The data processing apparatus of claim 16, further comprising:

a supervisor module arranged to reconcile an exit call gateway defining an exit point from said source domain with a corresponding target call gateway defining an entry point into said target domain.

18. A computer program product comprising program code on non-transitory computer-readable medium that, when executed on a processor, cause the processor to protect a target domain and a source domain from an unauthorized context switch from said source domain to said target domain, including:

identifying an exit call gateway comprising an exit transition instruction and at least one exit access parameter, said exit access parameters restricting exit of code from said source domain;

identifying an entry call gateway corresponding to said exit call gateway, said entry call gateway comprising a transition instruction and at least one entry access parameter, said entry access parameters restricting access of the code to said target domain;

determining that said exit access parameters and said entry access parameters are compatible with each other; and performing a context switch from said source domain to said target domain, when said exit access parameters and said entry access parameters are complied with, wherein performing said context switch from said source domain to said target domain comprises applying security credentials to the code transitioning from said source domain to said target domain to enable completion of a function and/or an access defined in said entry access parameters at said target domain; and denying said context switch from said source domain to said target domain when said exit access parameters and/or said entry access parameters are not complied with.

* * * * *